US010878598B2

(12) United States Patent
Fox et al.

(10) Patent No.: US 10,878,598 B2
(45) Date of Patent: *Dec. 29, 2020

(54) ASPECT FIT TECHNIQUES

(71) Applicant: Apple Inc., Cupertino, CA (US)

(72) Inventors: Tyler M. Fox, Santa Clara, CA (US); Kyle T. Howarth, San Jose, CA (US); James R. Montgomerie, Sunnyvale, CA (US); Stephen F. Holt, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/110,805

(22) Filed: Aug. 23, 2018

(65) Prior Publication Data

US 2019/0371010 A1   Dec. 5, 2019

Related U.S. Application Data

(60) Provisional application No. 62/679,861, filed on Jun. 3, 2018.

(51) Int. Cl.
*G06T 11/00*   (2006.01)
*G09G 5/00*   (2006.01)
*G09G 5/395*   (2006.01)

(52) U.S. Cl.
CPC ............. *G06T 11/00* (2013.01); *G09G 5/005* (2013.01); *G09G 5/395* (2013.01); *G06T 2210/12* (2013.01); *G06T 2210/22* (2013.01)

(58) Field of Classification Search
CPC . G06T 11/00; G06T 2210/22; G06T 2210/12; G06F 17/211; G06F 17/212; G09G 5/395; G09G 5/005
See application file for complete search history.

(56) References Cited

U.S. PATENT DOCUMENTS 7,564,425 B2    7/2009  Martinez et al.
9,965,136 B1 *  5/2018  Brichter ............... G06F 3/0481
(Continued)

OTHER PUBLICATIONS

Non-Final Office Action issued in U.S. Appl. No. 16/110,791, dated Oct. 4, 2019 in 22 pages.
(Continued)

*Primary Examiner* — Chante E Harrison
(74) *Attorney, Agent, or Firm* — Kilpatrick, Townsend and Stockton LLP

(57) ABSTRACT

Embodiments of the present disclosure present devices, methods, and computer readable medium for techniques to display rectangular content in non-rectangular display areas without clipping or cutting off the content. These bounding path techniques can be employed for electronic devices with rounded corners and for display of content within software windows for applications, in which the windows have non-rectangular corners. The techniques disclosed include content shifting, aspect fit, run length encoding and corner encoding. These techniques can be applied to both static content and for dynamic content. Memory optimization techniques are disclosed to reduce the memory requirements for encoding display bitmaps and for optimal performance. The run length encoding feature can reduce the time and decrease the memory requirements for determining a location where the content can fit within a viewable area of the display. The corner encoding technique provides for encoding areas with non-linear curves.

20 Claims, 20 Drawing Sheets

(56) References Cited

U.S. PATENT DOCUMENTS

| | | | |
|---|---|---|---|
| 10,607,375 B2 | 3/2020 | Fox et al. | |
| 2003/0189529 A1 | 10/2003 | Martinez et al. | |
| 2009/0327871 A1* | 12/2009 | Wolf | G09G 5/005 |
| | | | 715/243 |
| 2010/0177105 A1* | 7/2010 | Nystad | G06T 11/40 |
| | | | 345/522 |
| 2011/0193780 A1* | 8/2011 | Schaaf | G06F 1/1601 |
| | | | 345/163 |
| 2012/0032979 A1* | 2/2012 | Blow | G06F 1/1626 |
| | | | 345/647 |
| 2012/0102398 A1* | 4/2012 | Cok | G06T 11/60 |
| | | | 715/274 |
| 2014/0281934 A1* | 9/2014 | Zhang | G06F 17/212 |
| | | | 715/243 |
| 2016/0343116 A1* | 11/2016 | Park | G06T 3/40 |
| 2016/0358523 A1* | 12/2016 | Du | G09G 3/003 |
| 2016/0378231 A1* | 12/2016 | Kim | G06F 3/044 |
| | | | 345/174 |
| 2017/0052690 A1* | 2/2017 | Mikawa | G06T 3/40 |
| 2017/0098433 A1* | 4/2017 | Suzuki | G09G 5/246 |
| 2017/0309218 A1* | 10/2017 | Bae | G09G 3/2092 |
| 2018/0357979 A1* | 12/2018 | Nakamura | G09G 5/10 |
| 2019/0056854 A1* | 2/2019 | Azzolin | G06F 3/04845 |
| 2019/0121522 A1* | 4/2019 | Davis | G06F 3/04845 |
| 2019/0371263 A1* | 12/2019 | Fox | G09G 5/005 |

OTHER PUBLICATIONS

Final Office Action issued in U.S. Appl. No. 16/110,791, dated Mar. 2, 2020 in 24 pages.

Notice of Allowance issued in U.S. Appl. No. 16/110,791, dated Jun. 26, 2020 in 8 pages.

* cited by examiner

ASPECT FIT TECHNIQUES

CROSS-REFERENCED TO RELATED APPLICATIONS

This application claims priority to U.S. Provisional Application Ser. No. 62/679,861, filed Jun. 3, 2018 and entitled "Bounding Path Techniques," which is herein incorporated by reference in its entirety and for all purposes.

FIELD

The present disclosure relates generally to techniques for displaying content on a display of an electronic device. For example, aspects of the disclosure relates to techniques for displaying rectangular content in non-rectangular areas such that the content is properly displayed without cutting off (clipping) the content.

BACKGROUND

Displaying rectangular content on a non-rectangular area can cut-off the edges of the content in regions with curved corners or display cutouts. This is unattractive and results in a poor user experience. The applications or system software could be written to accommodate a specific non-rectangular display, but such customization can be time intensive and costly, particularly if the software is intended to run on numerous devices.

Besides non-rectangular hardware screen, secondary display areas can be opened within primary display areas of other, different applications. These secondary display areas may also not be rectangular in shape. Displaying rectangular content in such a non-rectangular area can also cut-off the edges of the content in regions with curved corners or display cutouts. This is also unattractive and results in a poor user experience because important information may not be displayed within the secondary display areas.

BRIEF SUMMARY

Certain embodiments are directed to techniques (e.g., a device, a method, a memory or non-transitory computer readable medium storing code or instructions executable by one or more processors) for displaying rectangular content (layout) in non-rectangular areas of a screen of an electronic device, e.g., without cutting off corners/regions of the content.

In some embodiments, a rectangular bounds can be created to encompass the non-rectangular area (e.g., a non-rectangular display). A bitmap can be created in the bounds, where each position (e.g., pixel) in the bounds has a value (e.g., 0 or 1) that identifies whether the position is viewable (e.g., viewable pixel) or not. Thus, a position may be an off-screen position that is not viewable. When an application requests to display rectangular content, the application can identify initial locations for displaying the rectangular content. In some implementations, these initial locations can be in a local coordinate space allocated to the application, where such space is rectangular and may be the rectangular bounds or a portion of the bounds (e.g., when the application is allocated only a portion of the screen). A display module can translate the local coordinates to global coordinates defined within the bounds, thereby obtaining initial global locations when applicable.

The one or more of the initial locations can be compared to the bitmap to identify whether they are viewable. For example, it can be determined whether a corner position of the translated rectangle is viewable. If it is not viewable, then the corner position can be shifted to a location that is viewable, e.g., shifting by one position and retrying or shifting by exact amount as may be done with run length encoding. Other positions can be tested, e.g., other corners and edges until border positions are confirmed to be viewable. In some implementations, the shifted global locations can be transformed back into the local coordinate space, and the display module can return the shifted local positions. In this manner, the content images can be programmatically shifted on the display to the extent necessary to avoid cutting-off the content.

In some embodiments, an aspect fit feature preserves an aspect ratio of content displayed in non-rectangular display areas. For example, an application executing on the computer device can send a request (e.g., to the operating system) to display content in a rectangular region the device with the non-rectangular display. The request can include an aspect ratio of the rectangular region and a local center point in local coordinates of the application. The rectangular region can have both a long dimension and a short dimension, wherein the long dimension is longer than the short dimension. The aspect fit technique can identify a long dimension of the rectangular region based on the aspect ratio and identifies a point in the non-rectangular area of the display.

An initial value for a selected dimension (e.g., long or short dimension) of the rectangular region can be selected to be displayed. A bitmap can be retrieved corresponding to a bounding box of the non-rectangular display area of the display, the bitmap can identify coordinates in the bounding box that are viewable in the non-rectangular display area and coordinates in the bounding box that are not viewable in the non-rectangular display area.

The operating system can use the bitmap to determine whether the initial value for the selected dimension extends into a non-viewable area of the display. When the selected dimension extends into the non-viewable area of the display, the system can adjust the selected dimension so that the selected dimension fits within the non-rectangular area of the display, thereby obtaining an adjusted rectangular region having the aspect ratio included in the request. In some embodiments, the short dimension can also be concurrently adjusted to preserve the aspect ratio of the content. Finally, the content can be displayed in the adjusted rectangular region on the display using an adjusted value for the selected dimension.

In some embodiments, a run length encoding technique can store a data structure that includes an array including a plurality of nodes. Each node of the array can include a first value indicating a number of positions within the group of positions, and can include a second value indicating whether the group of positions of the node are viewable or non-viewable. An application executing on the computing device sends a request to display the rectangular content in the non-rectangular area. The process can involve accessing the first bitmap to determine if an initial location for displaying the rectangular content is viewable by accessing the information stored in the array. Using the array information, the technique can determine if the content can be displayed at a different location based on the viewable area of the display. The run length encoding feature can reduce the time and decrease the memory requirements for determining a location where the content can fit within a viewable area of the display.

In some embodiments, a fast node copying process can use the run length encoding technique to select a particular portion of the bitmap needed when one application is allocated only part of a screen. The fast node copying process can copy the non-rectangular display shape down the hierarchy to windows viewable within each application. In some embodiments, the fast node copying process can receive an existing source bitmap (e.g., for entire non-rectangular screen) and a rectangular area allocated to the application. The rectangular area may lie wholly or partially inside the rectangular bounds of the existing bitmap. The fast node copying process can generate a new bitmap that represents a copy of the portion of the original bitmap that applies to just the rectangular area.

The corner encoding technique allows for encoding a corner of a rectangular with a non-linear curve. The technique then creates an resultant bitmap with is an intersection between a bitmap created by run length encoding and corner bitmaps created by corner encoding.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 4A illustrates an exemplary use case for content shifting on an electronic device for a first, exemplary orientation of a table view section index. FIG. 4B illustrates an exemplary use case for content shifting on an electronic device for a second, exemplary orientation a table view section index. FIG. 4C illustrates an exemplary use case for content shifting on an electronic device for a second, exemplary orientation a table view section index with content shifting.

FIG. 5A illustrates an exemplary use case for content shifting on a wearable device prior to content shifting. FIG. 5B illustrates an exemplary use case for content shifting on a wearable device for a first time period according to some embodiments. FIG. 5C illustrates an exemplary use case for content shifting on a wearable device for a second time period according to some embodiments. FIG. 5D illustrates an exemplary use case for content shifting on a wearable device for a third time period according to some embodiments.

FIG. 6A illustrates a depiction of a corner of an electronic device prior to content shifting. FIG. 6B illustrates a depiction of a corner of an electronic device employing content shifting.

FIG. 19A illustrates an exemplary diagram of a display of electronic device employing corner encoding according to some embodiments. FIG. 19B illustrates an exemplary diagram of a resulting intersection according to some embodiments.

DETAILED DESCRIPTION

Certain embodiments of the present disclosure relate to devices, computer-readable medium, and methods for implementing various techniques for encoding and displaying rectangular content in non-rectangular display areas. Embodiments can improve a user experience concerning displaying rectangular content in a non-rectangular area.

I. Bounding Path

Figure 1:
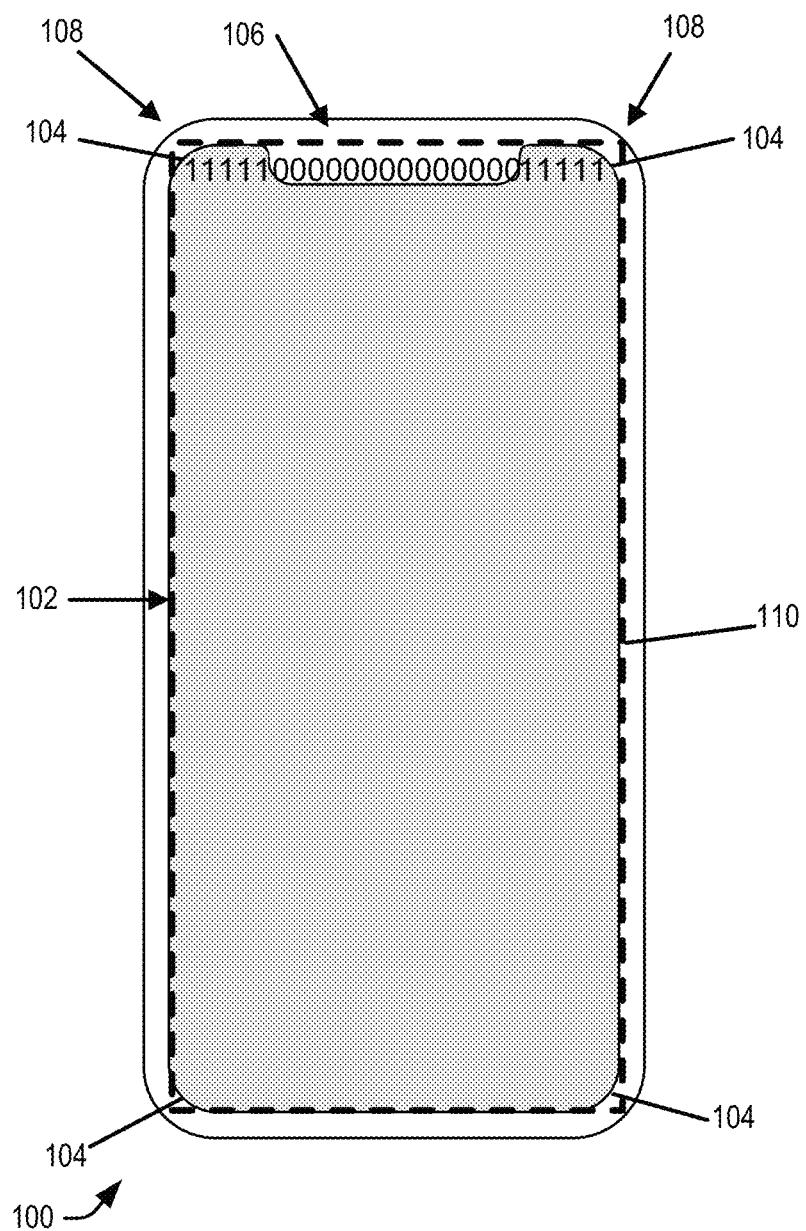
FIG. 1 illustrates an exemplary electronic device with a non-rectangular display.

FIG. 1 illustrates an exemplary electronic device 100 with a non-rectangular display 102. The exemplary electronic device 100 can be a smartphone. Other examples of electronic devices having non-reticular displays include but are not limited to versions of tablets or wearable devices. The electronic device 100 incorporates a non-rectangular display 102 has rounded corners 104 that follow a curved design, and these corners are within a standard rectangle. The electronic device display 102 employs new techniques and technology to precisely follow the curves of the design, all the way to the rounded corners 104. In order to incorporate sensors on the front face of the electronic device 100, a sensor cutout region 106 can be incorporated on the front face of the display 102. As used herein, a "bounding path" is the shape of a viewable area of a non-rectangular display. The bounding path of the electronic device 100 is depicted with gray shading.

The display 102 includes extension areas 108 in which content is viewable, but the shape of these extension areas 108 must be accounted for to avoid cutting off (clipping)

viewable content. As content is viewable in the extension area 108, FIG. 1 depicts a series of "1s" in the displayable area to signal the values for the positions within the extension areas 108. As content is not visible in the sensor cutout region 106, a series of "0s" is depicted in the sensor cutout region 106 to signal the values for the positions within the sensor cut out region 106. In some embodiments, non-displayable areas, such as the sensor cutout region 106, can be located in other regions of the display 102, for incorporation of sensors in the face of the display 102. FIG. 1 depicts a bounding box 110 encompassing the display of the electronic device 100. As used herein, a bounding box 110 is a rectangular area encompassing the entire non-rectangular display area.

FIG. 1 illustrates a portrait view of the display 102. Often the electronic device 100 can rotate the content presented on the display 102 to account for the orientation of the device 100. For example, as the electronic device 100 is rotated clockwise from the reference portrait view, as shown in FIG. 1, 90-degrees clockwise to a landscape view, the electronic device 100 can rotate the content to present in a landscape mode. The techniques disclosed herein account for the rotation of the electronic device 100 by un-rotating the content to reference a portrait orientation as shown in FIG. 1. In the reference portrait orientation, as shown in FIG. 1, the sensor cutout region 106 is oriented on top of the display 102.

The display 102 for the electronic device 100 can be comprised of millions of pixels. For example, a display 102, for an electronic device may be 2,436 by 1,125 pixels. A pixel is a shorthand expression for picture element, a pixel is a single point in a graphic image. Graphics displays divide the display screen into thousands (or millions) of pixels, arranged in rows and columns. The pixels are so close together that they appear connected. The number of pixels can determine the overall resolution of a display 102. A manufacturer can create a source bitmap for a display 102. The source bitmap can be a data structure which captures every position within a bounding box. If a position within the bounding box comprises a pixel and the position should be viewable. If a position in the bounding box does not contain a pixel, either because the position is in a sensor cutout region or because it is located on the outside edge of the bounding box with a rounded corner, the position is non-viewable. The source bitmap can be stored in a memory of the electronic device.

A. Generating a Source Bitmap

The manufacturer for a display 102 knows the location of viewable and non-viewable areas of the bounding box. To generate a source bitmap, the manufacturer can generate a data structure that identifies the coordinates of viewable and non-viewable positions. The source bitmap can be stored as a data structure such as an array, the array having a plurality of nodes. The source bitmap for a given display only need to be created once because the sensor cutouts and the general shape of the display do not change after manufacturing. The source bitmap can be referenced by applications of the electronic device 100 for determining viewable areas on the display 102.

The technique for generating a source bitmap can include identifying the bounding box for the non-rectangular area of the computing device. A bounding box 110 is a rectangular area encompassing the entire non-rectangular display area. A bitmap is a representation in which each item corresponds to one or more bits of information, especially the information used to control the display of a computer screen. A source bitmap can be created by checking each position (pixel) of the bounding box to determine if the position corresponds to a pixel and is thus viewable. Corner areas and areas inside sensor cut-outs do not contain pixels and therefore are not viewable.

The source bitmap can be created by checking every position in a line within the bounding box. A line can be either a horizontal row or a vertical column of positions. The source bit map can be a collection of values of ones (positions are not viewable) and zeros (positions are not viewable). The collection of ones and zeros can be stored as an array of thousands to millions of values representing each of the individual positions of a display. For example, one popular smart phone display contains 2,436 by 1,125 pixels. This display has 2,740,500 individual pixels. Hence, since the bounding box of the display contains non-viewable positions, the number of positions for this display would be over 2.7 million positions. The source bitmap values can be stored by horizontal rows and column numbers in a data structure. With the large number of positions for a modern display, the data structure for the source bitmap can be large to store in memory.

The source bitmap can also be generated using a technique called run length encoding. Using the run length encoding technique, the positions can be grouped by like value, indicating that the group is all viewable, having a value of one, or all not-viewable, having a value of zero. The group can be stored as a node having two values. The first value can indicate the value of the group, indicating whether the group is viewable or not viewable. The second value of the node can indicate the number of positions in the node. Each line can include one or more nodes depending on the viewable area of the display. For example, the array [{0, 10},{1,500},{0,10}] represents an exemplary line of an array created using run length encoding of a line having 520 positions. For the exemplary line, the first ten positions are not viewable, resulting in the first node {0,10}. The first position in the node is zero indicating the positions in the node are not viewable. The second position in the node is ten, indicating there are ten consecutive positions having the same value. The next 500 positions are viewable, resulting in a node of {1,50}. The last ten positions are also not viewable, therefore the final node is {0, 500}. If an entire line of 520 positions is viewable, the node for the line would be {1,520}. The run length encoding technique can be used to generate a similar array for each line of the bounding box. The arrays can be stored as a data structure in a memory of a computing device.

As can be seen, the data structure using the run length encoding technique can be much smaller than a data structure created using traditional encoding. For example, an exemplary array can comprise 1,000 lines with 520 positions for each line. This exemplary array would have 520,000 positions. Traditional encoding would save this exemplary array as 520,000 ones and zeros. However, using run length encoding, many of the lines that are entirely viewable could be encoded with simple a {1,520}. Therefore, the run length encoding technique would result in a considerable savings in memory and allow for faster determination if areas of the display are viewable or non-viewable.

The source bitmap, once created, can be referenced for several techniques disclosed herein. The source bitmap can be stored in a memory of the computing device.

B. System Architecture

Figure 2:
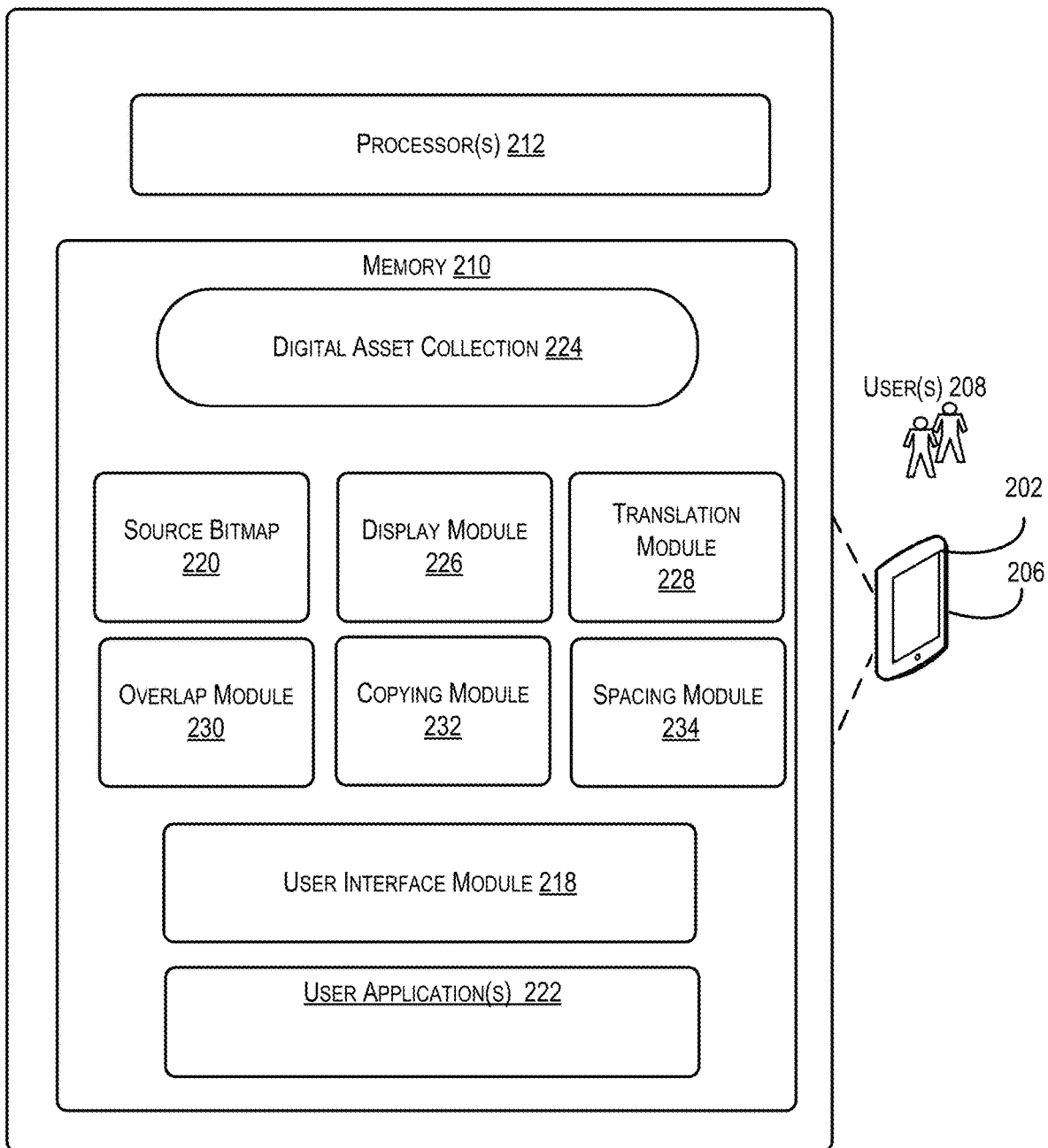
FIG. 2 illustrates a simplified block diagram depicting a system architecture for a system employing bounding path techniques according to some embodiments.

FIG. 2 illustrates a simplified block diagram depicting a system architecture 200, which includes modules for displaying content in non-rectangular areas. In some examples, computing device 202, having example architecture 200, can have various software modules stored in memory 210 and executed by one or more processor(s) 212 to result in content being depicted using a display module 226

Computing device 202 may be configured to execute or otherwise manage applications or instructions for performing the described techniques such as displaying rectangular content on a non-rectangular display without cutting off content. Computing device 202 may receive inputs (e.g., utilizing I/O device(s) such as at a touch screen 206 from a user(s) 208 at the user interface module 218, capture information, process the information, and then present the assets also utilizing I/O device(s) 204 (e.g., a speaker of computing device 202).

Turning to the contents of memory 210 in more detail, memory 210 may include one or more application programs or services for implementing the features disclosed herein including the user interface module 218, the source bitmap 220, and one or more user applications 222. A user application 222 (or App for short) is a set of computer instructions designed to perform one or more functions, tasks, or activities on an electronic device 202 for the benefit of the user 208. The user application 222 may be a first party application that is generated by the manufacturer of the electronic device 202. The user application 222, alternatively may be a third party application created by a developer other than the manufacturer of the electronic device 202.

The user application 222 can generate digital content that can be presented in a display area for a user. The user application 222 can generate static content (e.g., content for a webpage) or dynamic content (e.g., scrolling news feed). The user application 222 is generally developed to present content on multiple type of displays for various computing devices (e.g., tablets, smartphones, wearables). Even for the same type of computing devices, the size and shape of the displays can be different. Therefore, the user application 222 may not know the shape of size of the display on the computer device on which the user application 222 is being executed.

The computing device 202 also includes a user interface module 218. The user interface module 218 is utilized to output signals for a display 206 associated with the client computing device 202. The client computing device 202 also includes a display module 226 to interface with the display device. The client computing device 202 can request content data for the display from a media server (e.g., media server) via the network interface. In one embodiment, the media server provides the requested data in an XML format. The client computing device 202 can process the requested data and cause the user interface module 218 to present the content on the display 206. In some embodiments, object updater creates and updates objects used in the user interface module 218. For example, object updater creates a new user-interface object or updates the position of a user-interface object. The user interface updater updates the graphical user interface. For example, graphical user interface updater prepares display information and sends it to graphics module for display on a display 206 such as touch-sensitive display. Content can also be accessed from the digital asset collection 224. The digital asset collection 224 can include one or more digital assets stored in the memory 210 of the device 202. The digital asset collection can multimedia content including digital pictures, digital video, live photos, burst photos, and panoramic photos.

In some embodiments, a user application 222 may request to display digital content on the display 206 of the electronic device 202. The digital content may be configured for display on a rectangular display and may need to be adjusted to properly display on in a non-rectangular area without cutting off (clipping) a portion of the digital content. The user interface module 218 may reference the source bitmap 220, and use one of more of the disclosed techniques to adjust the size or location to display the digital content. The user interface module 218 can provide instructions to the display module 226 for adjusting, shifting, or resizing the digital content on the display 206. The generating the source bitmap 220 is described above.

A translation module 228 can translate content from local coordinates from a requested region for the user application 222 to the global coordinates of a display area. The translation module 228 can provide the display module 226 the new coordinates such that the display module 226 can determine locations to display content without cutting off (clipping) the digital content. The translation module 228 can move the content to the up, down, left, or right on the display as required to avoid cutting off (clipping) content on the display 206.

Applications executed on electronic devices 202 can often employ multiple windows on the display. Each window can display digital content from different applications. For example, content for a web browser can be displayed in one window and content from a social media application can be displayed in a second window. It is possible that a parent application can display content for a child application within a window of the window of the parent application. For example a social media application can display digital content for a second application, such as a video website, within a separate window. The second window can be a non-rectangular display area. A window within a window can be described as a view. A node copying technique can be used to propagate the screen-level shape down the hierarchy to windows and views within each application. The node copying technique can generate a new bitmap that represents a copy of the portion of the original bitmap that applies just to that rectangular region.

An overlap module 230 can determine if the digital content overlaps areas can be used to determine when a portion of a rectangle lies outside the source bitmap. If the rectangular region lies outside the source bitmap, the region is considered to be outside the bounding path and stored as zero in the nodes. The overlap module 230 determines when the bounding box of a first bitmap overlaps a source bounding box of a non-rectangular display of the computing device. This overlapping areas would result in an area that would be viewable without adjustment.

The overlap module 230 can check how much, if any, of the source "skip region" can be used for the new bitmap. The skip region is the rectangular area inside the bitmap where the entire width is all "inside" the bounding path, i.e., all "1s," in which the display has no curvature or cut-outs. The skip region can be encoded separately with a location and height, instead of needing one or more nodes for every row of pixels inside of it.

The node copying technique can determine the size of the new bitmap and the number of nodes stored in the source bitmap to compute the number of nodes that will be required to store the data in the new bitmap. It is desirable that the node copying technique allocate space for as few nodes as possible to reduce memory overhead of each bitmap. The node count may be zero if the entire bitmap is within the skip region. If this is the case, the node copying technique function is complete. If the node count is non-zero, the node copying technique can create and/or copy nodes for the new bitmap.

A copying module 232 can be used to copy digital content from the child application into the non-rectangular display area for the parent application. The copying module 232 can break up the digital content from the child application into discrete portions. The copying module 232 uses the inputs of an existing source bitmap and a rectangle of digital content. The rectangular region of digital content may lie wholly or partially inside the rectangular bounds of the existing bitmap. The copying module 232 returns a new bitmap that represents a copy of the portion of the original bitmap that applies just to that rectangular region The copying module 232 can proceed to iterate row-by-row of pixels in the rectangle for the new bitmap; for each row of pixels. If the row lies inside the new bitmap's skip region, the copying module 232 skips ahead and advances to the first row after the skip region. If multiple nodes are required for a row, the node copying algorithm can copy the nodes one by one.

The spacing module 234 can be used with the node copying technique. If digital content is being copies from the child application into the non-rectangular display area for the parent application, all or a portion of the digital content may lie outside the viewable area. Under these conditions, a spacing module 234 can determine where the content extends outside the source bitmap and how much of an adjustment would be required to bring the content within the viewable area. Under these circumstances, a spacing module 234 can be used to insert spacing nodes before or after the copied nodes. Simply, the spacing module 234 manages the spacing of content in the new bitmap so that content can be viewable. If the overlap module 230 determines that a source row is outside the source bitmap (above or below it), the spacing module can insert a single node representing the entire row is outside, and then continue on to the next row. If the new bitmap extends to the left of the source bitmap, the spacing module can insert a spacing node prior to the content. The spacing module 234 can determine the number of pixels to the left of the first node the spacing node need to be, and continue on to the next node.

If the row in the new bitmap corresponds to a row inside the skip region of the source bitmap, the spacing module 234 can create a node in the new bitmap to represent those columns. Then, if the new bitmap extends to the right of the source bitmap, the spacing module 234 can insert an extra new node indicating this entire right-hand extended region is outside. At this point, node copying technique is finished with this row of nodes in the new bitmap.

The spacing module 234 can find the node in the source bitmap that contains the current column for the new bitmap, if one exists. If no node was found, if the new bitmap extends to the right of the source bitmap, the spacing module 234 can insert an extra new node indicating this entire right-hand extended region is outside. Then, the node copying technique can continue on to the next row. If a node was found, the spacing module 234 can create and store a new node for the new bitmap using the data from the source node. The node copying technique can continue on to the next node if necessary.

Bounding path techniques can enable proper display of rectangular content in non-rectangular displays without cutting off or clipping the content. These techniques can also be employed for displaying rectangular content a window of a display, in which the window has curved edges. The bounding path is the effective shape of the view. The bounding path encompasses the viewable display area. The bounding path can also represent a portion of the viewable display area in cases where applications provide a limited area in which to display content. The bounding path techniques are robust enough to express the true shape for any view. The bounding path techniques can be used to derive periphery inserts and can be employed for multiple use cases.

C. Non-Rectangular Display Use Case

Applications for electronic devices often are programmed to produce rectangular content for display. For devices with non-rectangular display, displaying the rectangular content on the display without any type of adjustment can result in the edges or corners of the content being clipped due to the non-displayable areas. The electronic devices that employ non-rectangular displays can include smartphones, tablets, wearable devices, laptop computers, or other portable electronic device.

II. Content Shifting

Content shifting is one technique to make adjustments for the display of digital content in a non-rectangular area of a display. According to some embodiments, a rectangular bounds is created to encompass the non-rectangular area (e.g., a non-rectangular display). A bitmap is created in the bounds, where each position (or pixel) in the bounds has a value (e.g., 1 or 0) that identifies whether the position (or pixel) is viewable or not. Thus, a position (or pixel) may be an off-screen, non-viewable position. When an application wants to display rectangular content, the application can identify initial locations for displaying the rectangular content. These initial locations may be in a local coordinate space allocated to the application, where such space is rectangular and may be the rectangular bounds or a portion of the bounds (e.g., when the application is allocated only a portion of the screen). A display module 226 can translate the local coordinates to global coordinates defined within the bounds, thereby obtaining initial global locations.

In some embodiments, one or more of the global locations are compared to the bitmap to identify whether they are viewable. For example, it can be determined whether a corner position of the translated rectangle is viewable. If it is not viewable, then the corner position can be shifted to a position that is viewable, e.g., shifting by one position and retrying or shifting by an exact amount as may be done with run length encoding. Other positions can be tested, e.g., other corners and edges until border positions are confirmed to be viewable. In various embodiments, the shifted locations can be local or global. For example, the shifted global locations can be transformed back into the local coordinate space, and the display module 226 can return the shifted local locations. In this manner, the content images can be programmatically shifted on the display to the extent necessary to avoid cutting-off the content.

Figure 3:
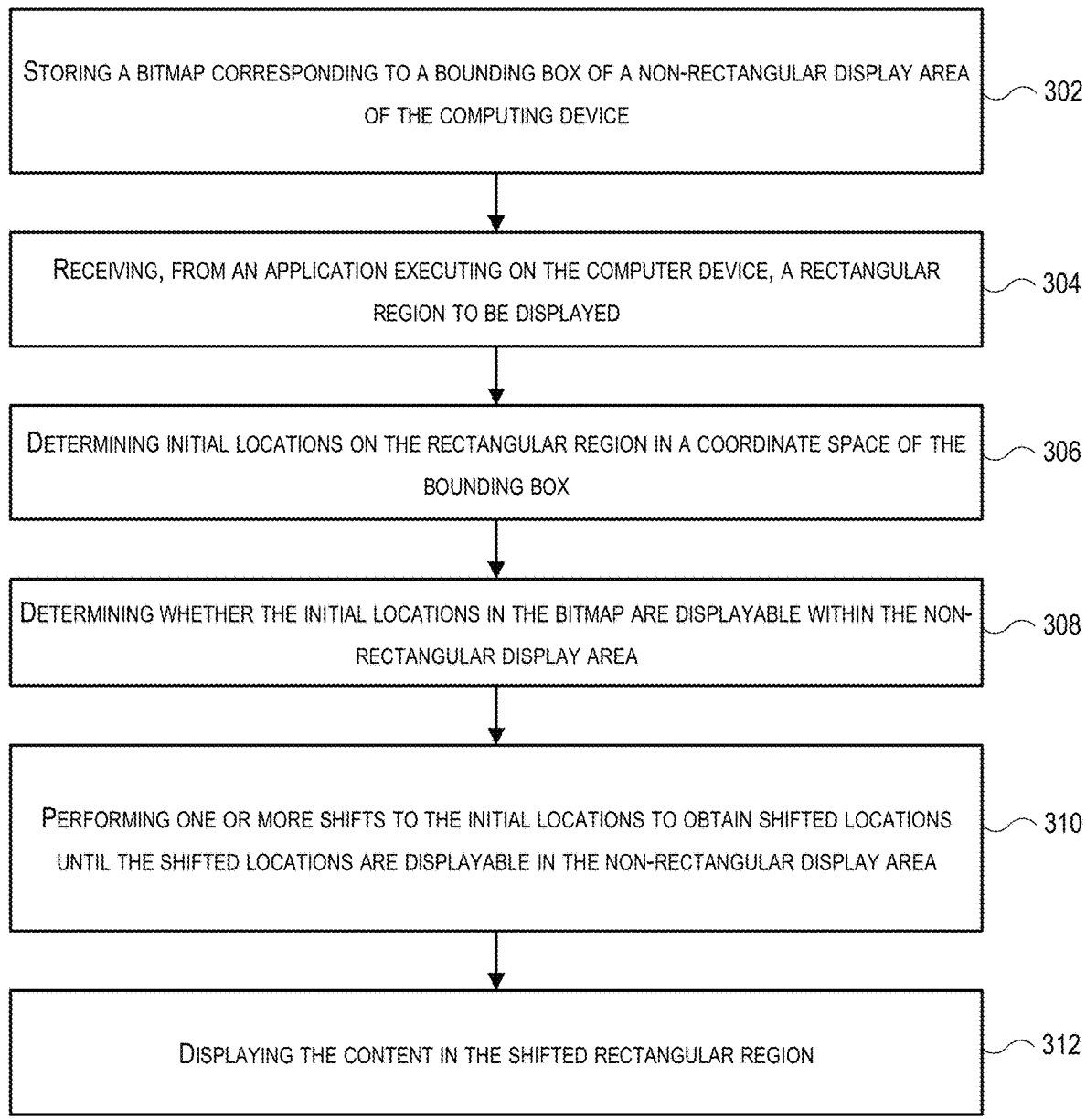
FIG. 3 illustrates an exemplary flow diagram of content shifting according to some embodiments.

FIG. 3 illustrates an exemplary flow diagram of a method 300 for content shifting according to some embodiments. Content shifting can be described as a method for displaying content on a non-rectangular area of a display of a computer device. The content shifting method can be performed by one or more processors of the computing device. The content shifting technique can be used for both static layout and dynamic content. Several exemplary use cases for content shifting are described herein, however, the content shifting technique is not limited to the use cases described.

At 302, a bitmap corresponding to a bounding box of a non-rectangular display area is stored in the memory of a computing device. The bitmap can be stored in a memory of an electronic device. The process of storing the bitmap can be executed by the one or more processors of the computing device. The bitmap can be stored in a data structure. The data structure can be comprised of an array. The array can comprise one or more nodes of information. The bitmap can identify the coordinates in the bounding box that are viewable in the non-rectangular display area. A position that is viewable can mean that there is a corresponding position for the position on the display. A position that is not viewable can mean that there is no pixel for the position or, alternatively, that the position is outside a viewable area for a window within a window on a display.

At 304, a rectangular region to be displayed can be received from an application executing on the computer device. An application, running on the computing device, can request to display content on the display. The application can request an area to display either static or dynamic content. The application can be programmed to request a rectangular region that includes digital content. The digital content can include a plurality of pixels that can comprise text or graphics. The application can also request to display static or dynamic content in a rectangular region. In some embodiments, the application can be a first party application that is developed by the manufacturer of the computing device. In some embodiments, the application can be a third party application that is developed by a party that is not the manufacturer of the device.

At 306, an initial position for the rectangular region is determined in a coordinate space of the bounding box. The initial position can be any area on the display including a location at the upper right portion of the display. The coordinate space can include a row and column number for a position on the display. The initial position can be saved in a memory.

At 308, the initial locations in the bitmap are evaluated to determine if the initial locations are displayable within the non-rectangular display area. In various embodiments, this can be accomplished by referencing the source bitmap for the display or by referencing a first bitmap, where the displayable area is within a sub-region of the display. An initial location can be displayable is all of the rectangular region fits within an area with positions that are viewable. If all, or a portion of, the rectangular region falls outside the displayable area, determined by a comparison with a source bitmap, the bitmap can be considered not displayable within the non-rectangular display area.

At 310, one or more shifts to the initial locations can be performed to obtain shifted positions until the shifted positions are displayable in the non-rectangular area. The content shifting technique can include shifting the position one or more positions (pixels) to the right, down, left or up as required to be viewable in the display area. The one or more shifted positions can result in a shifted rectangular region. After an initial shift is performed, the position can be checked again to determine if the entire rectangular region is viewable. If some or all of the rectangular region remains outside the viewable area, one or more additional shifts can be performed as required. To account for the rotation of view of an electronic device, the view can be rotated to a portrait view prior to performing the one or more shifts to the one or more initial positions of the rectangular region. In some embodiments, the one or more shifts can comprise shifting by a plurality of positions, as opposed to one position at a time, for each of the one or more shifts.

At 312, Finally, the content in the shifted rectangular region can be displayed. The content can be displayed in the shifted rectangular region and after shifting has been performed the rectangular region should not be cut-off (clipped). In some embodiments, the coordinates for the shifted rectangular region can be translated from local coordinates for the application to global coordinates for the non-rectangular area.

The API starts with content inscribed in a rectangle within the bounding path. The rectangle starts by checking the edges of the rectangle first to see if the rectangle can be displayed within the bounding path of the device and therefore be viewable. The corners of the rectangle are checked first followed by the edges. If the rectangle cannot be inscribed within the bounding path, the content can be shifted such that the content will appear within the bounding path.

In some embodiments, the rectangular content can be reduced in size, by shrinking. The technique can start using the rectangular content shrink (insets) it on one or more edges until it fits within the bounding path. Then a new rectangle can be created based on the shrunken output rectangle to achieve the content shifting. In some embodiments, rectangle shrinking alone can provide the necessary adjustment to fit the rectangular content within the bounding path; in these cases shrinking is not used solely as a means to achieve shifting. For example, when we have a vertical (up & down) scroll indicator, we use content shifting to find the appropriate horizontal (x-axis) position for that indicator, but the actual length that the indicator is allowed to extend is determined solely by shrinking the full-height rectangle to fit in the display shape. Therefore, the technique of content shifting can include shrinking the rectangular content. In some embodiments, content shrinking can be sufficient to fit the rectangular content within the bounding path such that content shifting is not required.

It will be appreciated that the content shifting technique 300 described in FIG. 3 is illustrative and that variations and modifications are possible. Steps described as sequential may be executed in parallel, order of steps may be varied, and steps may be modified, combined, added or omitted.

1. Static Layout

Static layout can include information displayed from applications running on the electronic device or content displayed from a website. Just as in the case with dynamic content, images depicted in a non-rectangular area may be cut off or clipped when displayed. With static layout, the content only needs to be positioned once on the display. The techniques disclosed herein allow for adjustments to the display of digital content to avoid these problems.

Figure 4A:
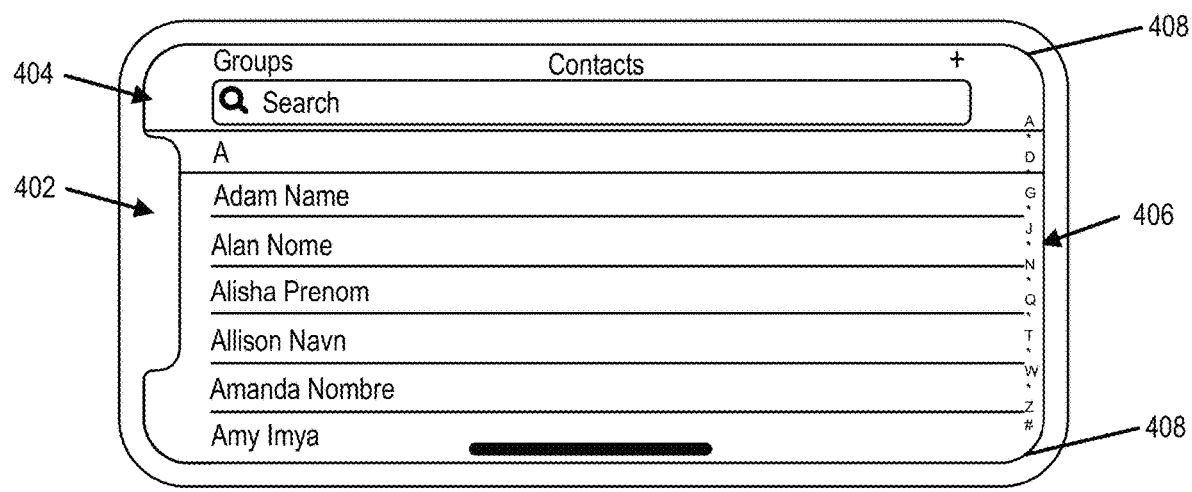
FIGS. 4A-4C illustrate an exemplary use case for content shifting on an electronic device according to some embodiments.

FIG. 4A illustrates an exemplary use case for content shifting for static layout on an electronic device for one exemplary orientation of a table view section index. FIG. 4A illustrates contacts in a graphical user interface 400 displayed an electronic device in landscape view with the sensor cutout region 402 on the left side of the display 404. The display 404 illustrated in FIG. 4A has curved edges 408. The graphical user interface 400 depicts a quick section index 406 on the right edge of the display. The quick section index 406 can allow a user to quickly jump to the section of the index, in this case of contacts represented by the letters displayed in the index. For example, selecting "N" in the index would allow a user to jump to the section of the list with first names beginning with "N." As depicted the quick section index 406 can be depicted on the right most edge of the display 404. However, the quick section index 406 can be displayed in such a way that the curved edges of the display do not cut-off or clip the top or bottom of the quick section index 406.

Figure 4B:
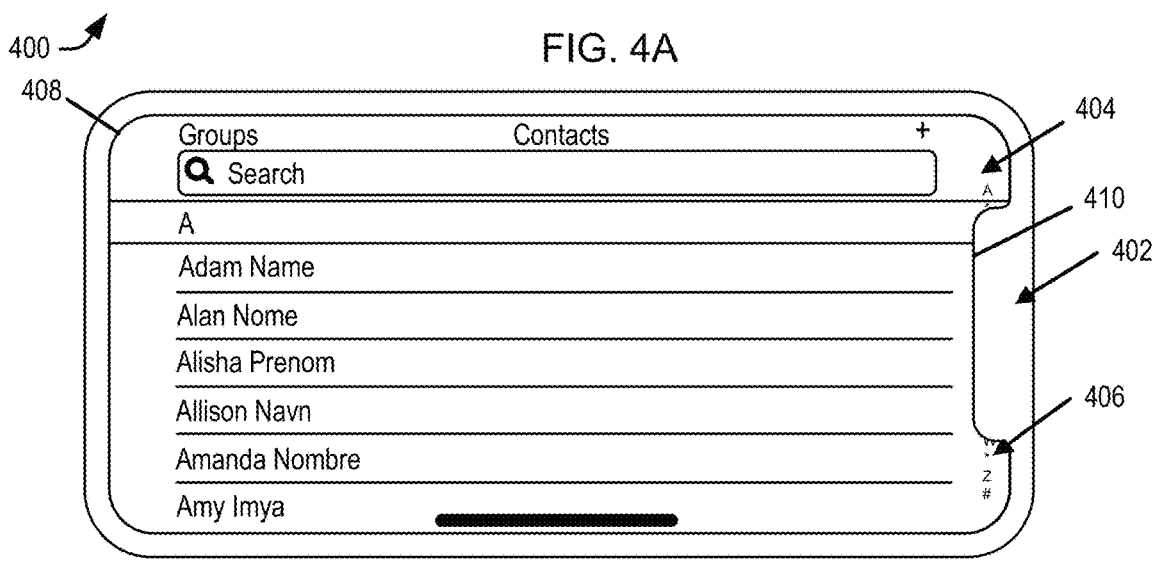

FIG. 4B illustrates an exemplary depiction of what may occur displaying rectangular content on a non-rectangular display. FIG. 4B depicts how the display would change if the electronic device was rotated 180 degrees. The contact information is still displayed with the text from left to right on the display 404. The display 404 illustrated in FIG. 4B has curved edges 408. As can be seen in FIG. 4B, the quick section index 406 is depicted along the right side of the display 404. However, due to the sensor cut out region 402 the, a portion of the content in the quick section index 406 is cut-off. This is undesirable because it renders the quick section index 406 unusable for the region that is not displayed. The content shifting technique can be used to shift the quick section index 406 to the left so it is outside the sensor cut out region 402.

Figure 4C:
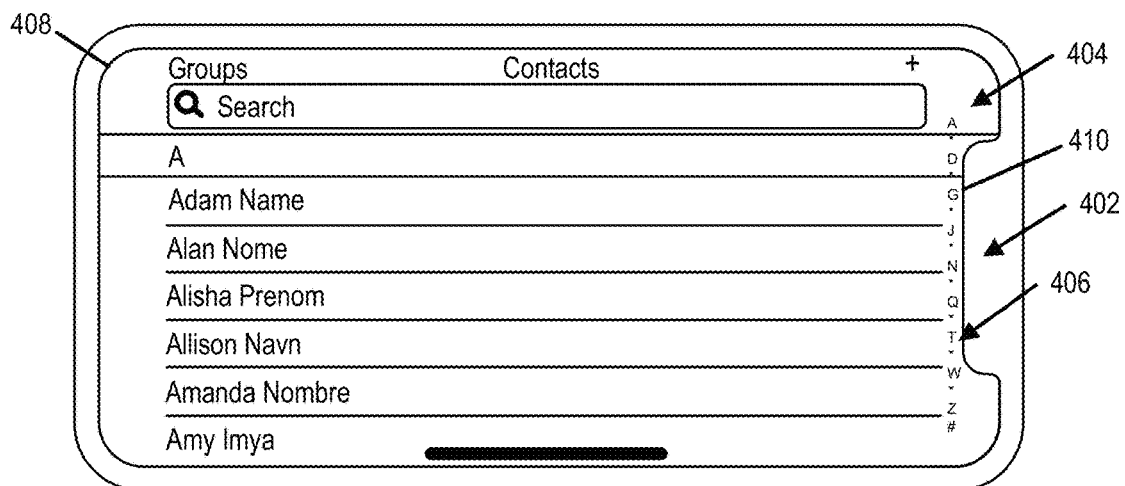

FIG. 4C illustrates an exemplary use case for content shifting on an electronic device for one exemplary orientation a table view section index. Through application of content shifting, the quick section index 406 can be captured as a rectangular region. The content shifting technique can determine an initial location on the rectangular region in a coordinate space of the bounding box of computing device. By accessing the source bitmap of the computing device stored in memory, the display module would determine that the initial location, the right edge of the bounding box would be outside the viewable area of the display 404. The display 404 illustrated in FIG. 4C has curved edges 408. The content shifting technique can perform one or more shifts, in this case to the left, to move the quick section index 406 until the quick section index 406 can be viewed without being cut-off. As shown in FIG. 4C, the quick section index 406, is displayed to the left of the edge 410 of the display 404 to account for the non-viewable area for the sensor cutout region 402. This depicts one possible use case of content shifting to avoid display challenges associated with non-rectangular display areas.

2. Dynamic Content

Dynamic content can include digital images or text that moves from one area in a display to another. Dynamic content can include various animation techniques. A common example of dynamic content can be messages starting at the top of a display and moving downward over time exiting the display at the bottom of the display. Dynamic content can follow the curve of the display. If the message consists of text and is the display of the message is left justified (meaning that the left edge of the message is displayed against the left side of the display), adjustments can need to be made to prevent clipping the message at the top and the bottom of the display. One adjustment can include shifting the message to the right by a number of positions such that the edge of the message follows the curves in the left edge of the display. In some embodiments, the rectangular region comprises dynamic content and the one or more initial positions for the rectangular region in the bitmap vary over a period of time. For dynamic content using content shifting, the technique involves asking for a position multiple times.

Figure 5A:
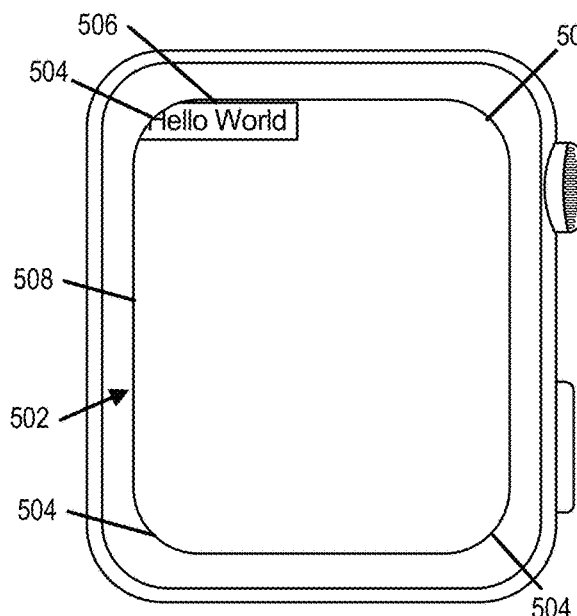
FIGS. 5A-5D illustrates an exemplary use case for content shifting on a wearable device according to some embodiments.

FIGS. 5A-D illustrate another exemplary use case for content shifting on a wearable device 500 according to some embodiments. FIG. 5A depicts the display 502 of a wearable device 500 prior to content shifting. As shown in FIG. 5A, the display 502 of the wearable device 500 includes rounded corners 504. The rounded corners 504 create challenges for the display of rectangular content on the non-rectangular display 502 of the wearable device 500. Without adjustments, content such as the exemplary text message 506, here "Hello World" would be clipped if displayed along the left edge 508 of the display 502 as shown in FIG. 5A. The use of content shifting allows the exemplary text message 506 to be shifted to the right such that the exemplary text message 506 is not displayed in the non-viewable areas in the vicinity of the rounded corners 504. In accordance with the techniques of content shifting, the exemplary text message 506 is contained within a rectangle. If the exemplary text message 506 were to scroll from the top to the bottom of the display 502 the position of the exemplary text message 506 would be adjusted such that the message would be viewable against the left edge 508 of the display.

Figure 5B:
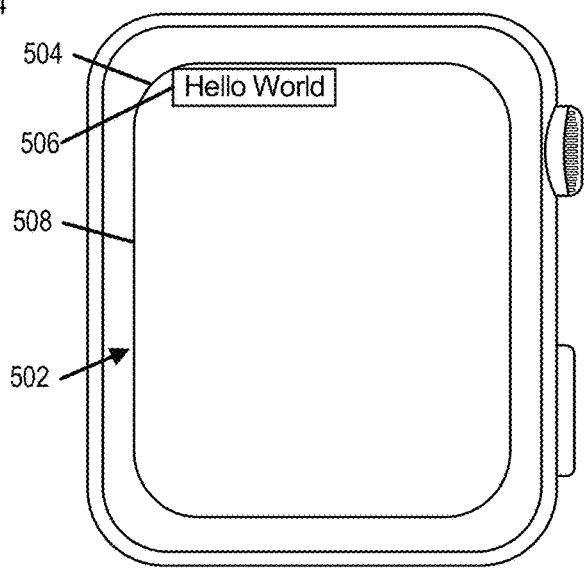

FIG. 5B illustrates an exemplary use case for content shifting on a wearable device for dynamic content according to some embodiments. FIG. 5B represents a first time period for which the exemplary text message 506 is shifted to the right so the entire message is viewable on the display. Through application of content shifting, the exemplary text message 506 can be captured as a rectangular region. The content shifting technique can determine an initial location on the rectangular region in a coordinate space of the bounding box of computing device. By accessing the source bitmap of the computing device stored in memory, the display module would determine that the initial location, the left edge of the bounding box would be outside the viewable area of the display due to the curved corners of the display. The content shifting technique can perform one or more shifts, in this case to the right, to move the exemplary text message 506 until it can be viewed without being cut-off. The exemplary text message 506 can be display on the display along the right edge of the display such that the message is not cut-off.

Figure 5C:
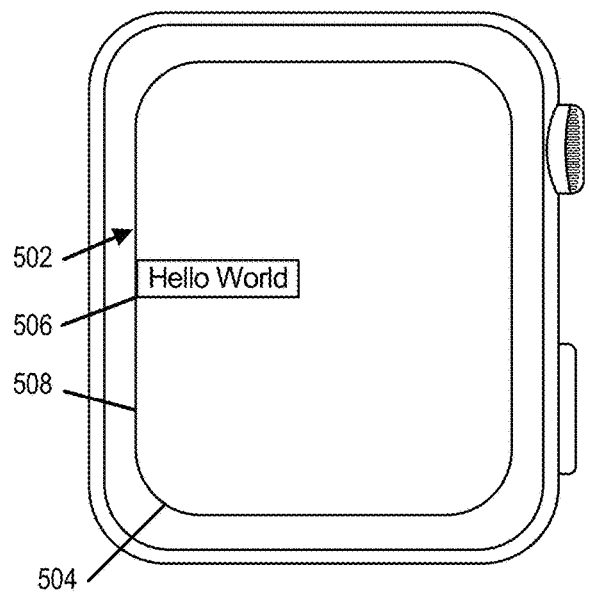

FIG. 5C illustrates an exemplary use case for content shifting on a wearable device for a second time period according to some embodiments. The second time period occurs after the first time period. As shown in FIG. 5C, the exemplary text message 506 is displayed such that the exemplary text message 506 is against the left edge 508 of the display. As shown in FIG. 5C the exemplary text message 506 scrolls from the top to the bottom of the display 502 the exemplary text message 506 is depicted along the left edge 508 of the display 502. Content shifting would not be required for the second time period because the exemplary text message 506 can be displayed in a viewable area of the display 502 without being cut-off (clipped).

Figure 5D:
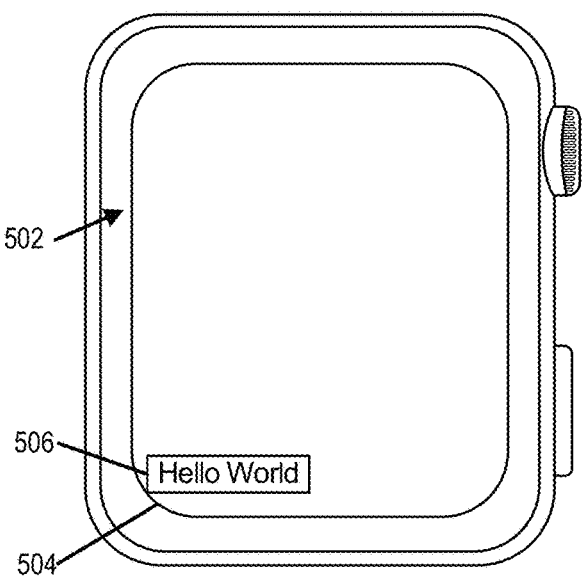

FIG. 5D illustrates an exemplary use case for content shifting on a wearable device for a third time period according to some embodiments. The third time period occurs after the second time period. As shown in FIG. 5D, the exemplary text message 506 is again shifted to the right to account for the rounded corner 504 of the display 502. The use of content shifting allows the exemplary text message 506 to be shifted to the right such that the exemplary text message 506 is not displayed in the non-viewable areas in the vicinity of the rounded corners 504.

Figure 6A:
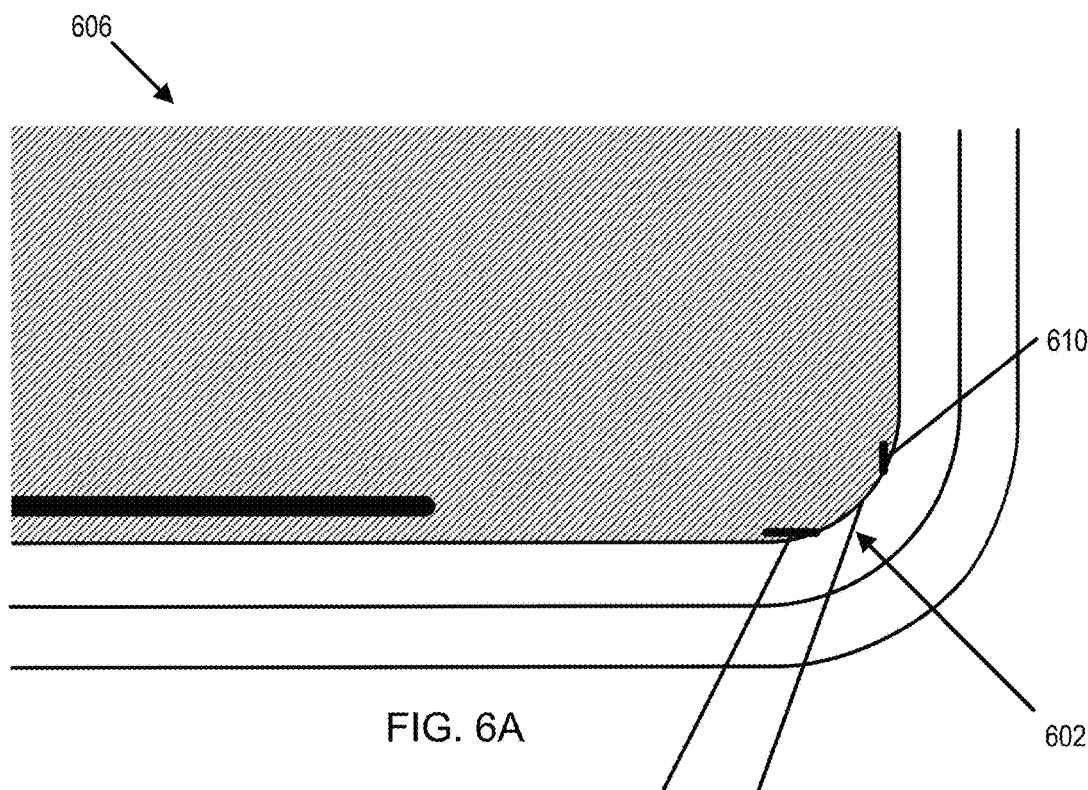
FIG. 6A-6B illustrate exemplary use case for content shifting on an electronic device for scroll indicators according to some embodiments.

FIG. 6A illustrates another exemplary use case for content shifting on an electronic device for scroll indicators according to some embodiments. FIG. 6A depicts a corner 602 of a graphical user interface 600 on an electronic device with rounded corners. Graphical user interfaces often contain content that cannot be displayed completely within the boundaries of the display 606. Applications provide scroll indicators 608, 610 for graphical user interfaces 600 to allow a user to scroll the display to reveal additional content. The scroll indicators 608, 610 help inform a user of the portion of viewable content that is currently displayed. For rectangular displays the scroll indicators would move in the direction of the user's scrolling until reaching the end of additional content. For example, scrolling to the right on the display would result in moving the horizontal scroll indicator to the right. This scrolling could move the scroll indicators 608, 610 to the corner 602 of the display 606. However, in the case for a display 606 with rounded corners 604 moving the scroll indicators 608, 610 all the way to the corner would result in the scroll indicators 608, 610 being cut-off in the vicinity of the rounded corners as shown in FIG. 6A, resulting in a poor user experience.

Figure 6B:
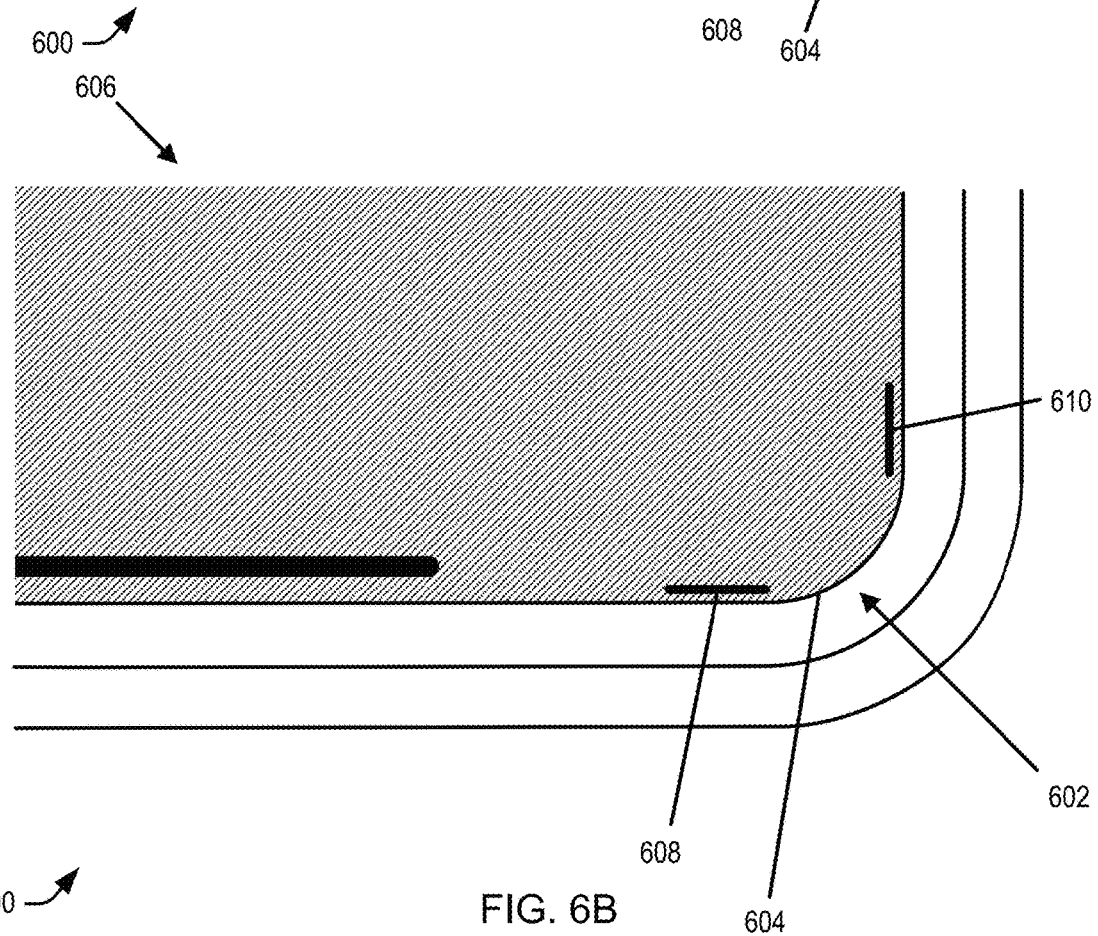

FIG. 6B illustrates another exemplary use case for content shifting on an electronic device for scroll indicators according to some embodiments. Content shifting can allow for proper display of the scroll indicators 608, 610 by shifting the horizontal scroll indicator 608 to the left when in the right bottom corner of the display 606. Content shifting can also allow for proper display of the vertical scroll indicator 610 by shifting the indicator up such that it is not in the non-viewable area of the corner 602 of the display 606. Through application of content shifting, the horizontal scroll indicator 608 can be captured as a rectangular region. The content shifting technique can determine an initial location on the rectangular region in a coordinate space of the bounding box of computing device. By accessing the source bitmap of the computing device stored in memory, the display module would determine that the initial location, the bottom right edge of the bounding box would be outside the viewable area of the display due to the curved corners of the display. The content shifting technique can perform one or more shifts, in this case to the left, to move the horizontal scroll indicator 608 until it can be viewed without being cut-off.

Similarly, through application of content shifting, the vertical scroll indicator 610 can be captured as a rectangular region. The content shifting technique can determine an initial location on the rectangular region in a coordinate space of the bounding box of computing device. By accessing the source bitmap of the computing device stored in memory, the display module would determine that the initial location, the bottom right edge of the bounding box would be outside the viewable area of the display due to the curved corners of the display. The content shifting technique can perform one or more shifts, in this case up, to move the vertical scroll indicator 610 until it can be viewed without being cut-off.

Vehicle displays can incorporate multimedia displays including map applications. As vehicle displays shift from traditional separate gauges (e.g., speedometer, transmission gear indicator, fuel level gauges) into composite electronic devices, manufactures seek creative ways to present the same types of information to drivers in a single electronic display. As the display needs to be incorporated within the dashboard of the vehicle, often the space reserved is limited. With limited space, it would be useful to take advantage of the full space on the display to present various different types of content to a driver. This content can include a navigation interface, a speedometer, a clock, an outside air temperature gauge, a distance to destination, a speed limit for the current road, a collision avoidance display, and a transmission gear indicator. By use of bounding path techniques, the navigation application can occupy a larger area of a display onto which to display content because the content can be displayed to the curved edges without being cut-off. Other applications of bounding path techniques include use with control center applications, electronic book applications, map applications, note applications, and website browser applications.

III. Aspect Fit

Aspect fit is a technique to preserve the aspect ratio of digital content for display in a non-rectangular area. Users of electronic devices with a non-rectangular displays would like to preserve the aspect ratio of the digital content displayed on the device without cutting-off or clipping any portion of the digital content, while at the same time maximizing the viewable area of the display. The aspect fit technique provides one solution.

Figure 7:
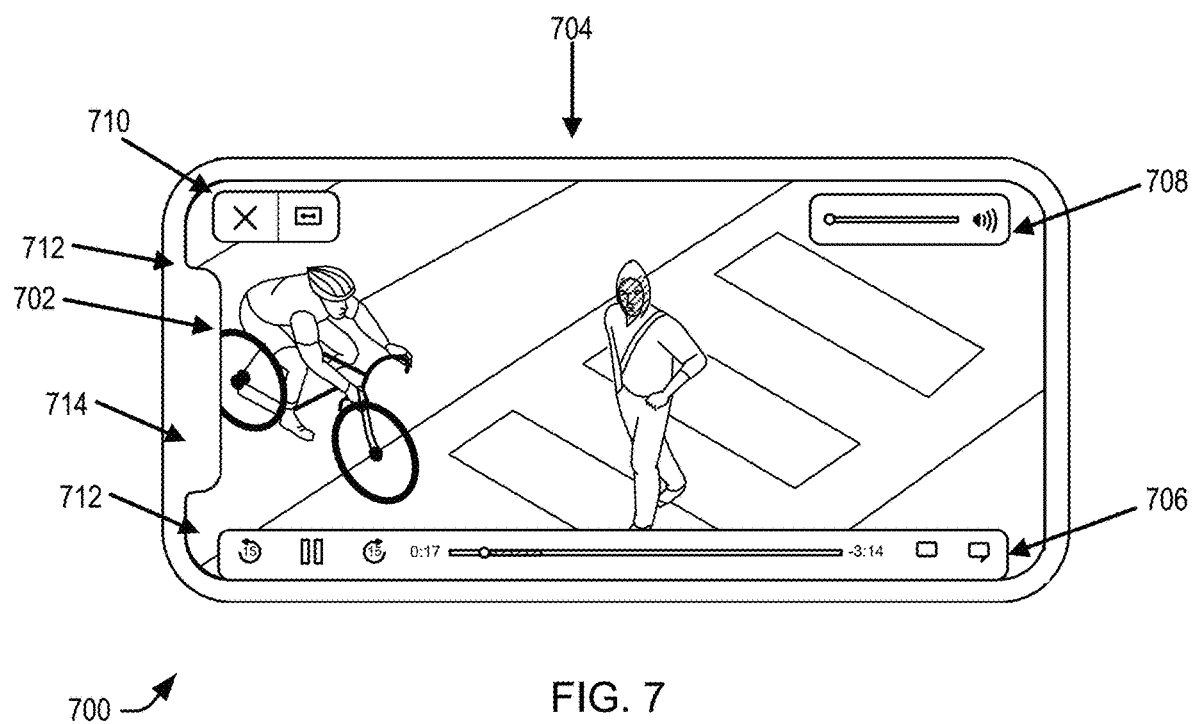
FIG. 7 illustrates an exemplary depiction of a computing device with a media player prior to employing aspect fit.

FIG. 7 illustrates an exemplary depiction of a multimedia player application 700 of an electronic device in landscape orientation displaying rectangular content 702 on a non-rectangular display 704. The media player application 700 may have various controls such as video controls 706, audio controls 708, and application window controls 710, and display extensions 712. As can be seen in FIG. 7, the rectangular content 702 is displayed in the viewable area of the non-rectangular display 704. As can be seen in FIG. 7 this results in cutting off (clipping) of content in both the curved corners and in the area of the sensor cutout region 714. This is undesirable and results in a poor user experience.

Figure 8:
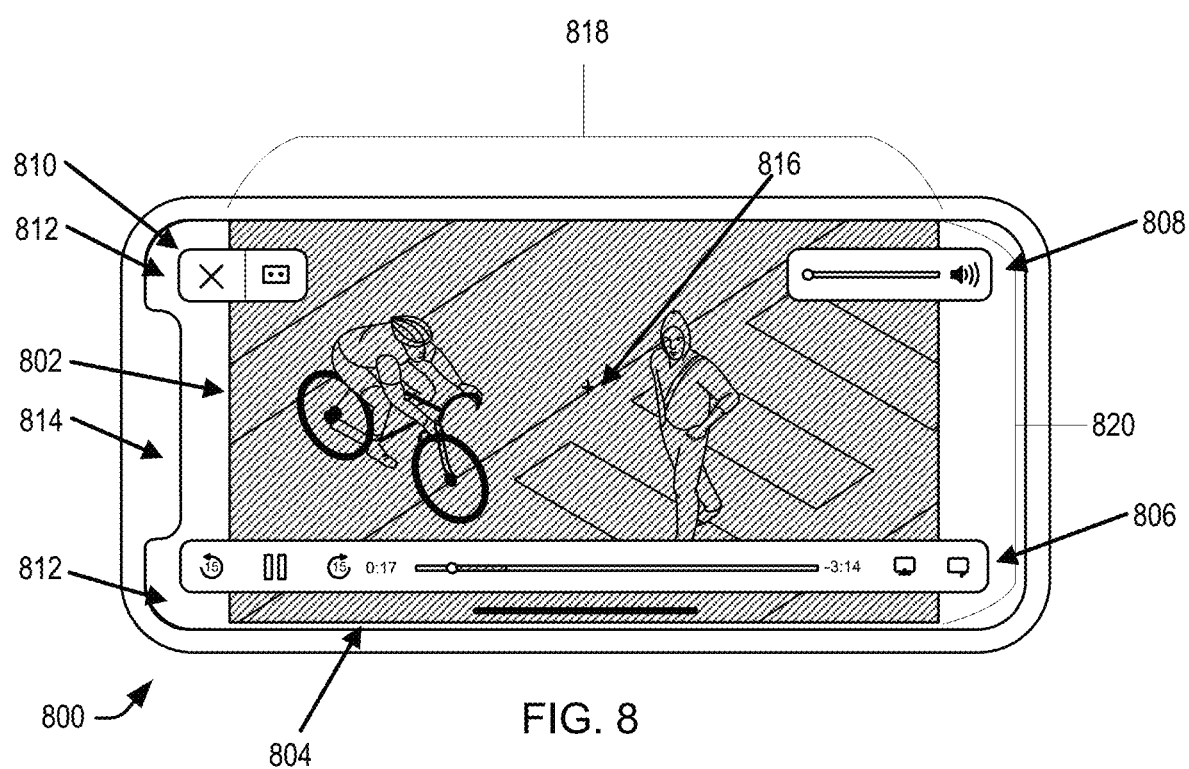
FIG. 8 illustrates a computing device employing the aspect fit technique.

As can be seen in FIG. 8, while using the aspect fit technique, the rectangular content 802 can be displayed in the largest rectangular area within the viewable area of the non-rectangular display 804 while maintaining a given aspect ratio such that media is not displayed in the display extensions 812 or the sensor cutout region 814. The media player application 800 may have various controls such as video controls 806, audio controls 808, and application window controls 810. The aspect fit technique can include receiving, from an application executing on the computer device, here a media player, a request to display rectangular content 802, where the computing device has a non-rectangular display 804, and where the request includes an aspect ratio of the rectangular region and a local center point in local coordinates of the application. The aspect fit technique can include identifying a long dimension 818 of the rectangular content 802 based on the aspect ratio, the long dimension 818 being longer than a short dimension 820 of the rectangular content 802. The aspect fit technique can identify a point 816 in the non-rectangular area of the non-rectangular display 804. The aspect fit technique can select an initial value for the long dimension 818.

The aspect fit technique can retrieve a bitmap corresponding to a bounding box of the non-rectangular display area of the display, the bitmap identifying coordinates in the bounding box that are viewable in the non-rectangular display area and coordinates in the bounding box that are not viewable in the non-rectangular display area. The aspect fit technique can use the bitmap to determine whether the initial value for the long dimension extends into a non-viewable area of the display. When the long dimension extends into the non-viewable area of the display, as is the case with FIG. 8, the aspect fit technique can adjust the long dimension 818 so that the long dimension 818 fits within the non-rectangular area of the display, while also adjusting the short dimension 820 to preserve the aspect ratio, thereby obtaining an adjusted rectangular region having the aspect ratio included in the request. The aspect fit technique can display the content in the adjusted rectangular region on the display using an adjusted value for the long dimension. As shown in FIG. 8, the content is no longer being cut off by the sensor cutout region or the curved corners.

Figure 9:
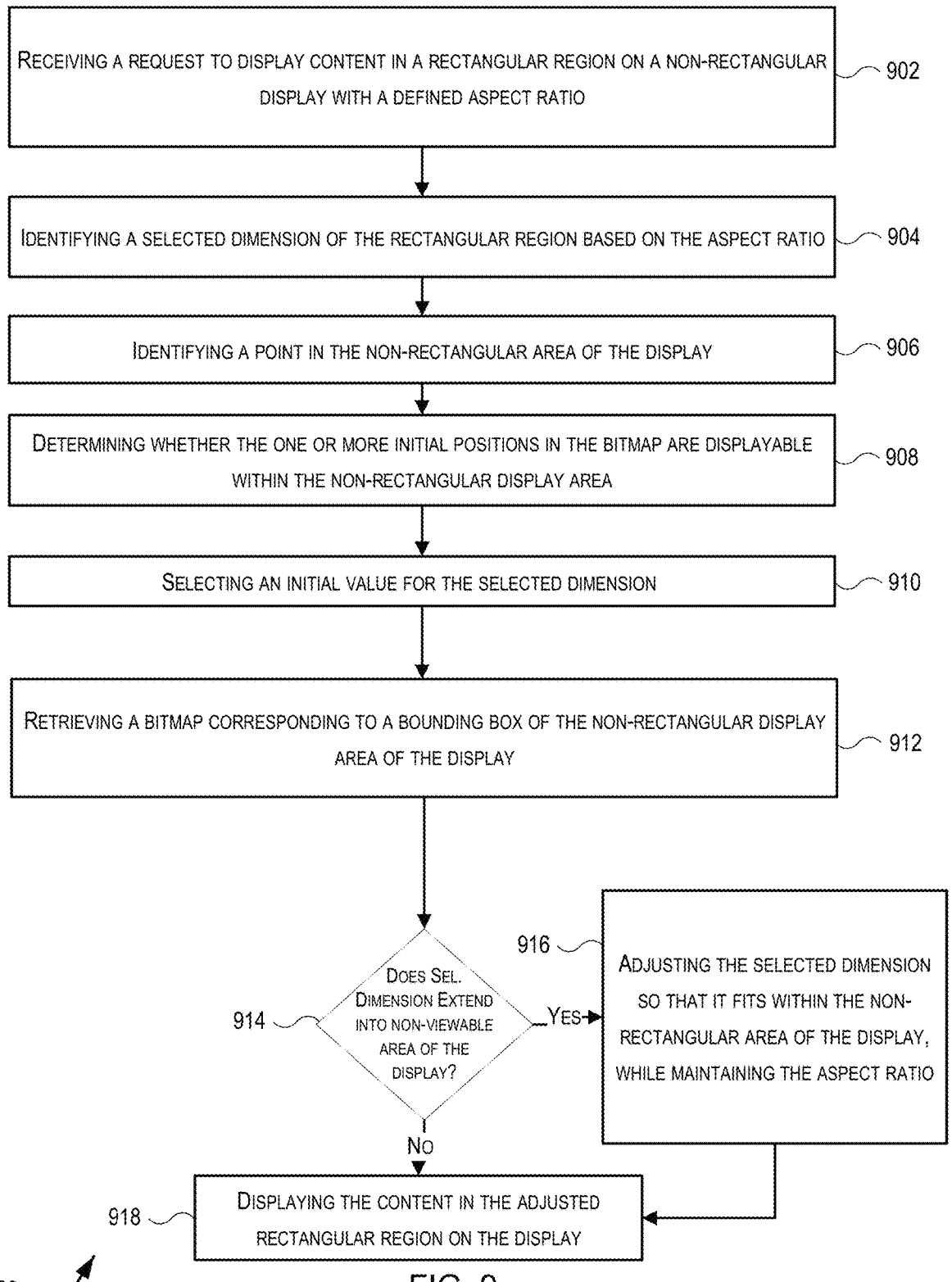
FIG. 9 illustrates an exemplary flow diagram of aspect fit according to some embodiments.

FIG. 9 illustrates an exemplary flow diagram of aspect fit according to some embodiments. The aspect fit technique allows for displaying content with a defined aspect ratio in a non-rectangular area of a display of a computing device. The aspect fit technique can be performed by one or more processors of the computing device.

At 902, the user interface module can receive a request to display content in a rectangular region from an application executing on the computer device with a non-rectangular display. For example, as shown in FIG. 8 a media player application 800 requests to present content on the non-rectangular display. The request includes an aspect ratio of the rectangular region and a local center point in local coordinates of the application. The content can be any type of digital content such as a movie, a picture, a live photo, a panoramic photo, a presentation, a document, or a slide. The non-rectangular display can be a smartphone, a tablet, a wearable, a laptop or any type of electronic device in which one or more portions of the display are non-rectangular (curved).

The aspect ratio refers to the proportions of the height and width of an image. It defines its overall shape, and it is usually shown as W:H (W is the width and H is the height). The most common aspect ratios used today in the presentation of films in cinemas are 1.85:1 and 2.39:1. Two common video graphic aspect ratios are 4:3 (1.33:1), the universal video format of the 20th century, and 16:9 (1.77:1), universal for high-definition television and European digital television. The most common aspect ratio today is 16:9, which means that if the width is divided into 16 equal parts, the height of the TV or picture should be 9 parts. An aspect ratio of 16:9 works for TVs since that is the format modern TV shows are delivered on, but most movies are made using the cinema standard, which is 21:9. 21:9 is much wider, so parts of the screen need to be filled with black bars above and below the image in order to fit most displays. For smartphone displays the trend has been towards widescreen, 16:9 aspect ratios since the turn of the decade, first at 1,920×1,080 pixels (Full HD) and then at 2,560×1,440 pixels (Quad HD).

At 904, the user interface module can identify a selected dimension of the rectangular region based on the aspect ratio. The long dimension can be defines as being longer than a short dimension of the rectangular region. The two dimensions of the rectangular content can be compared to determine which dimension of the content is longer. For example, as shown on FIG. 8 the long dimension 818 is longer than the short dimension 820. The longer dimension 818, as depicted in FIG. 8, can be identified as simply the long dimension. The shorter dimension 820, as depicted in FIG. 8, can be identified as the short dimension.

At 906, the user interface module can identify a point in the non-rectangular area of the display. The user interface module uses the point to anchor the rectangular content. In some embodiments the point can comprise a global center point, i.e., a center point on the screen of the device or of the allocated window, as opposed to a point that is off-center. A global center point can be determined by finding an intersection of a first line that bisects at the midpoint of the long dimension and a second line that bisects the midpoint of the short dimension. The local coordinates for this point can be saved in memory. In FIG. 8, a global center point 816 is indicated.

At 908, the user interface module can determine the one or more initial positions in the bitmap are viewable within the non-rectangular display area. By referencing the source bit map, the user interface module can determine if the content is viewable within the non-rectangular display area without content being cut-off. If the content is viewable without cutting off content at the desired aspect ratio, no further steps are required for this process. In FIG. 7, content is being cut off within the sensor cut-off region, therefore adjustments to the dimensions can be made.

At 910, the user interface module can select an initial value for a selected dimension (e.g., either long or short dimension). The selected dimension can be the long dimension or the short dimension. In some embodiments, increasing the size of the digital content will result in the shorter dimension entering the non-viewable area prior to the longer dimension. The aspect fit technique can access the dimensions of the display from the source bitmap. Using the source bitmap information, the aspect fit technique can select an initial value for the selected dimension that will fit within the display. The initial value can be stored as a length measurement or a number of positions in the memory for the computing device At 912, the user interface module can retrieve a bitmap corresponding to a bounding box of the non-rectangular display area of the display, the bitmap identifying coordinates in the bounding box that are viewable in the non-rectangular display area and coordinates in the bounding box that are not viewable in the non-rectangular display area. The bitmap information can be accessed from the memory of a computing device. In some embodiments, the bitmap information can be accessed from a storage device incorporated in the computing device.

At 914, the user interface module can use the bitmap to determine whether the initial value for the selected dimension extends into a non-viewable area of the display. The aspect fit technique can compare the initial value of the selected dimension of the content with the bitmap information to determine if the selected dimension extends into a non-viewable area of the display. If the selected dimension does not extend into a non-viewable area of the display, the aspect fit technique can be displayed centered on a point in the non-rectangular area of the display. The point can be a global center point of the display. In FIG. 7, the long dimension extends into the non-viewable area, therefore the long dimension is selected.

At 916, when the selected dimension extends into the non-viewable area of the display, the user interface module can adjust the selected dimension so that the long dimension fits within the non-rectangular are of the display, while also adjusting the short dimensions to preserve the aspect ratio, thereby obtaining an adjusted rectangular region having the aspect ratio included in the request. The adjusting can include increasing or decreasing the selected dimension of the rectangular content. In some embodiments, the non-selected dimension can be adjusted concurrently with the selected dimension to maintain the desired aspect ratio. In some embodiments, adjusting the selected dimension can result in adjusting the short dimension to preserve the aspect ratio, thereby obtaining an adjusted rectangular region having the aspect ratio in the request. In some embodiments, the adjusting the selected dimension can be performed incrementally (e.g., making small adjustments to fine tune the length of the selected dimension). The coordinates of the adjusted rectangular region can be stored in memory. In FIG. 8 the long dimension 818 is adjusted to fit within the viewable area.

At 918, the user interface module can display the content in the adjusted rectangular region on the display using an adjusted value for the selected dimension. The aspect fit technique can display the content in the adjusted rectangular region centered on the point in the non-rectangular area of the display. In some embodiments, the coordinates of the adjusted rectangular region can be translated from local coordinates for the application into the global coordinates for the non-rectangular display area.

It will be appreciated that the aspect fit technique 900 described in FIG. 9 is illustrative and that variations and modifications are possible. Steps described as sequential may be executed in parallel, order of steps may be varied, and steps may be modified, combined, added or omitted.

IV. Window in a Window

Computer applications often display content in windows on a display. Computing devices often allow the opening of one or more windows on a display. Often a first application allows access to a second application, in the display for the first application. In this type of window within a window scenario, a first application opens up a second window to display content from a different, second application. It is desirable that the second application know very little about the first application in order to prevent data transfer between the applications for security purposes. With this type of scenario, it is desirable to only provide the size and shape of a displayable area to the second application for displaying content. It is desirable that the second application not know what portion of the display the content is to be presented. The techniques disclosed herein within can allow presentation of content in a non-rectangular area in a window on a display. These techniques not only allow the content to be presented without clipping or cutting off portions of the content, but also provides a means to restrict data flow between applications.

A. Non-Rectangular App/Extension Scenes

Figure 10:
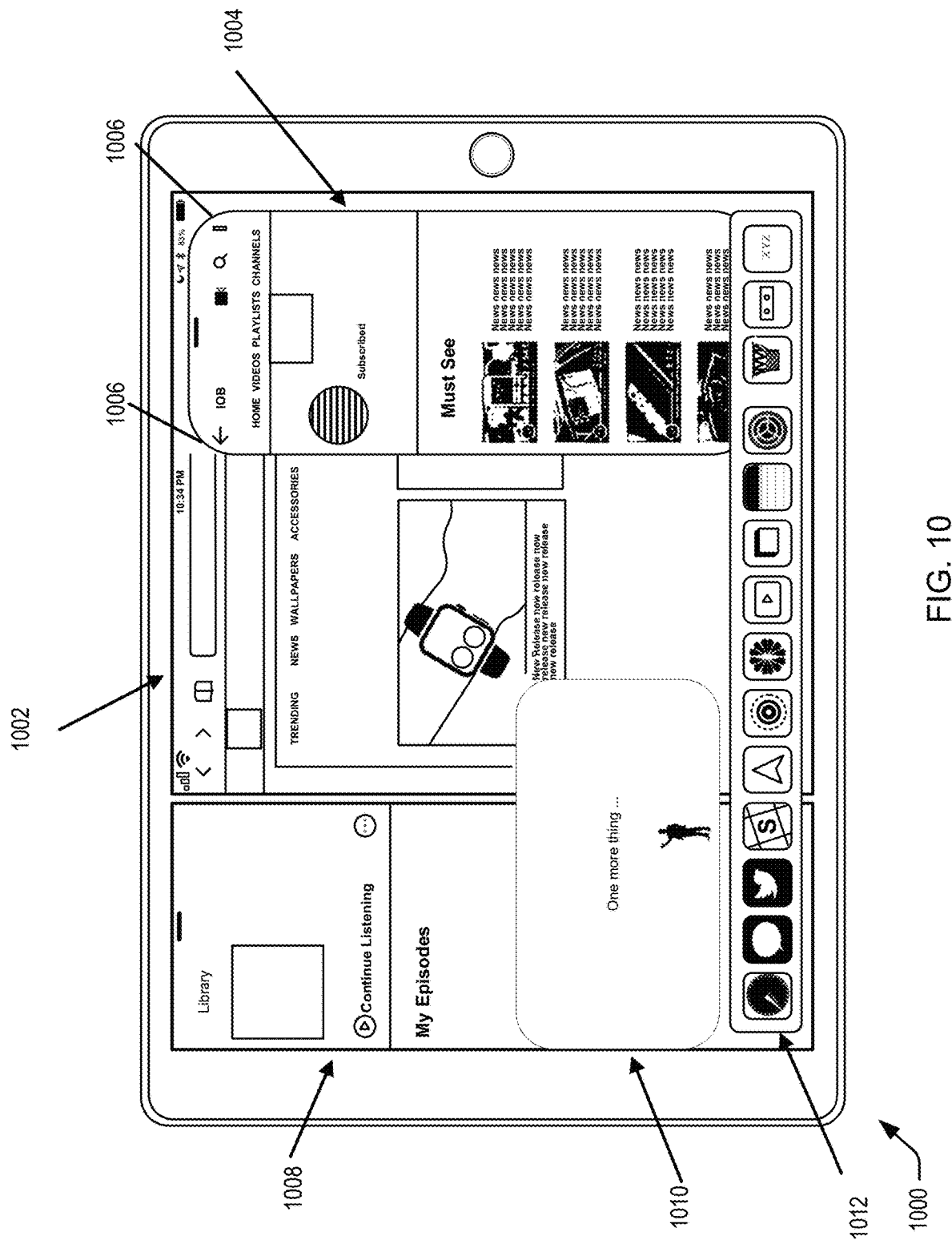
FIG. 10 illustrates an exemplary electronic device using bounding path techniques to display content in a first window within a non-rectangular area of a second window.

FIG. 10 illustrates an exemplary electronic device 1000 displaying content displayed in a first window with a non-rectangular area within a second window. FIG. 10 illustrates an exemplary electronic device such as a tablet that is displaying multiple windows. For example, a first window 1002 is displayed in one region of the display. A second window 1004, is displayed within it portion of the first window 1002. The second window 1004 is depicted having non-rectangular corners 1006. A parent application, such as a web browser, can be seen in the first window 1002. Selecting keywords in the parent application can result in opening a second window 1004 for displaying additional content. A child application can also display content within the second window 1004. Additional windows 1008 and pop-ups 1010 can be displayed as well. Further, application icons can be displayed providing the user an interface 1012 for selecting different applications. Although depicted on a tablet, the window within a window technique can be applied to a smartphone, laptop, wearable or other computing device with a display.

B. Enhanced Security

The disclosed techniques also provide for the concept of view services. View services allows for each application rendering its own user interface within a separate process. This method provides for security and privacy of data because the first application cannot share private information regarding to a second application. All that is propagated between the applications is the shape of the display window in which a second application has available for presenting content. For example, if a social media application is being displayed within another first application, it is desirable not to share the display location for the social media application. The only relevant information that needs to be shared is the size and shape of the nonrectangular area for display of the social media content. For example, in FIG. 10, a parent application, e.g., a web browser is displaying content in a first window 1002. A child application is displaying different content in a view (window 1004) within the first window.

It is possible that the social media application can infer that the user is using some other first application, however it is desirable not to share the shape of the entire display, but only share the relevant portions into which the social media application can have available to display its content. In essence, the user interface is providing a local space a shape that can be used for displaying content. In some embodiments this local space may be noncontiguous and be broken into one or more different spaces in which to display content. Therefore, sharing only the size and shape of the display area preserves the privacy and security of the information from the first application. Therefore, the parent application for the web browser in the first window 1002 would not share any information with the child application other than the size and shape of the second window 1004. Another technique to provide privacy and enhanced security features is to limit the information flow primarily from parent application to child application. The child application may request to display content, but the parent application only discloses the size and shape of the display area for use by the child application. The child application is unable to ascertain additional information about the contents of the parent application, or the true position of the second window on the display. This information flow helps limit the flow of data between the parent and child applications and provides for enhanced security. Therefore, the child application shown in FIG. 10 would not know what the type of application the parent application is, the position on the display the second window 1004 is. The information flow from the parent application would only include the size of the second window 1004 and the fact that the second window 1004 has curved corners 1006.

Other processes can be employed to manage multiple software applications or processes executed in different windows of an electronic device. A portion (e.g., block of software code) of a second application's user interface may be hosted by the first application or vice versa for security and/or performance reasons. For example, a portion of the child application's software code may be hosted by the parent application of FIG. 10. The display content for a user interface is managed by a view manager (e.g., view controller or group of view controllers). The view manager manages the views for the processes executed on an electronic device.

The processing logic can receive with a first service at least one request for animation (e.g., change orientation of device from portrait to landscape, change orientation of device from landscape to portrait, resize content, etc.) from a first process (e.g., software application, social media application, etc.) through a first API. For example, the web browser of FIG. 10 can represent a first operation. The request to generate content in a second window 1004 can represent a first process. The processing logic can temporarily prevent the at least one request from transferring from the first service to a render server by forming a barrier. Barriers may be established to perform operations only when a certain set of conditions has executed. The processing logic can transfer the at least one request from the first service to a second service associated with a second process (e.g., software application, email composition application, etc.).

The second service may be a software application operating within a view of the first window 1002. A second API associated with the second service may include a second view manager (e.g., view controller(s)) to manage views associated with the second process. In this manner, a large portion of software code may be moved out of process from the second view manager to the first view manager or vice versa. The first service may include a framework (e.g., public framework that can be accessed by the first application, public framework for email composition) that is associated with the second service (e.g., private interface for email composition). The second service may include a private interface that is associated with the second process.

In this way, the view manager of the first application can control a portion of the view for the second application synchronizing animation between the processes and improving security.

Further details can be found in U.S. Patent Pub. No. 2013/0328887A1, entitled "Methods and Systems for Hosting a Portion of a User Interface and Synchronizing Animation Between Processes," which is incorporated in its entirety and for all purposes.

C. Popover

Figure 11A:
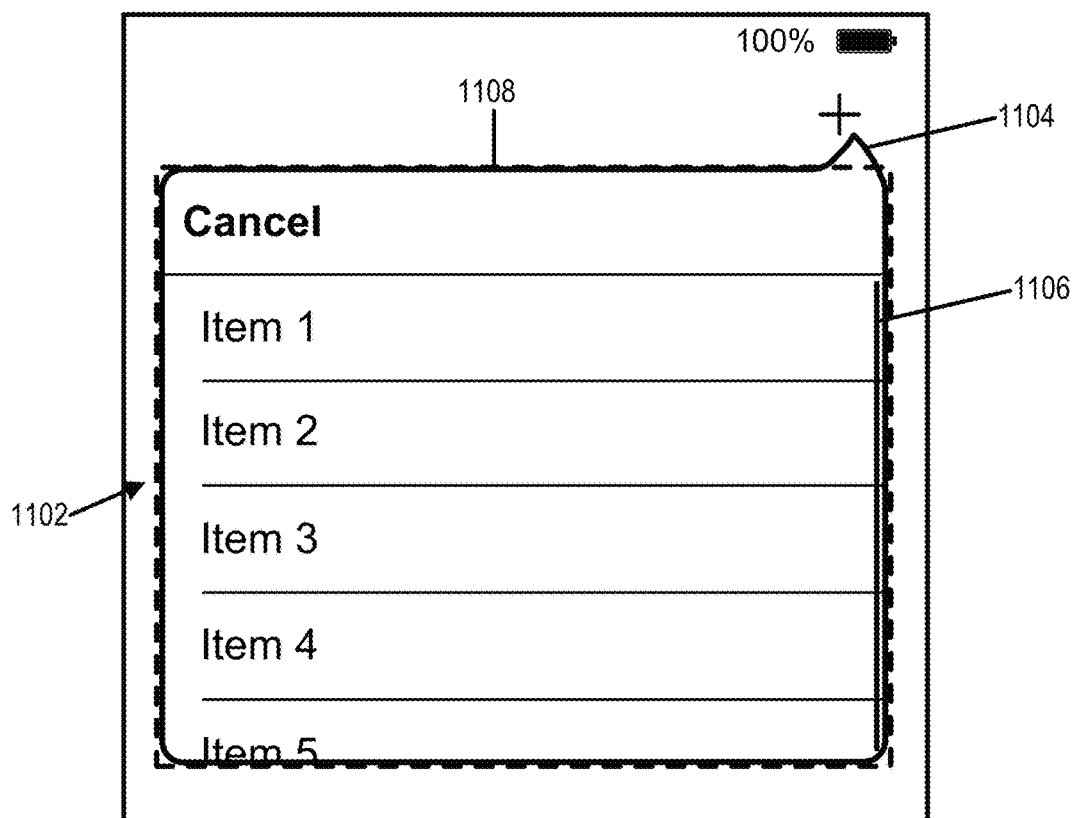
FIG. 11A illustrates an exemplary popover window without employing bounding path techniques.

FIG. 11A depicts the popover user interface 1100 for an electronic device prior to implementation of bounding path. Popovers provide a lightweight way to present or gather information from the user and are commonly used in the following situations: to display information about an object on the screen, to manage frequently accessed tools or configuration options, to present a list of actions to perform on objects inside one of your views, to present one pane from a split view controller when the device is in a portrait orientation. The use of a popover for the preceding actions is less intrusive and cumbersome than a modal view. In electronic tablet apps, modal views can be reserved for situations where the application requires the user to explicitly accept or cancel some action or information. For example, applications employ a modal view to ask a user for a password that granted access to the rest of the application. In other embodiments, applications can use a popover instead. The advantage of popovers is that they do not cover the entire screen and can be dismissed by simply tapping outside the popover view. Thus, they are an excellent choice in situations where user interactions with the application content are not required but provide information or additional features for the user.

The displayable area 1102 for the popover includes the heading "Cancel" and list view "Item 1, Item 2, Item 3 . . . etc." However, a corner notch 1104 is not including within the displayable area 1102 of certain embodiments. This would result in the scroll indicator 1106 being limited within the displayable area 1102 because the title bar 1108 displayed on the screen.

Figure 11B:
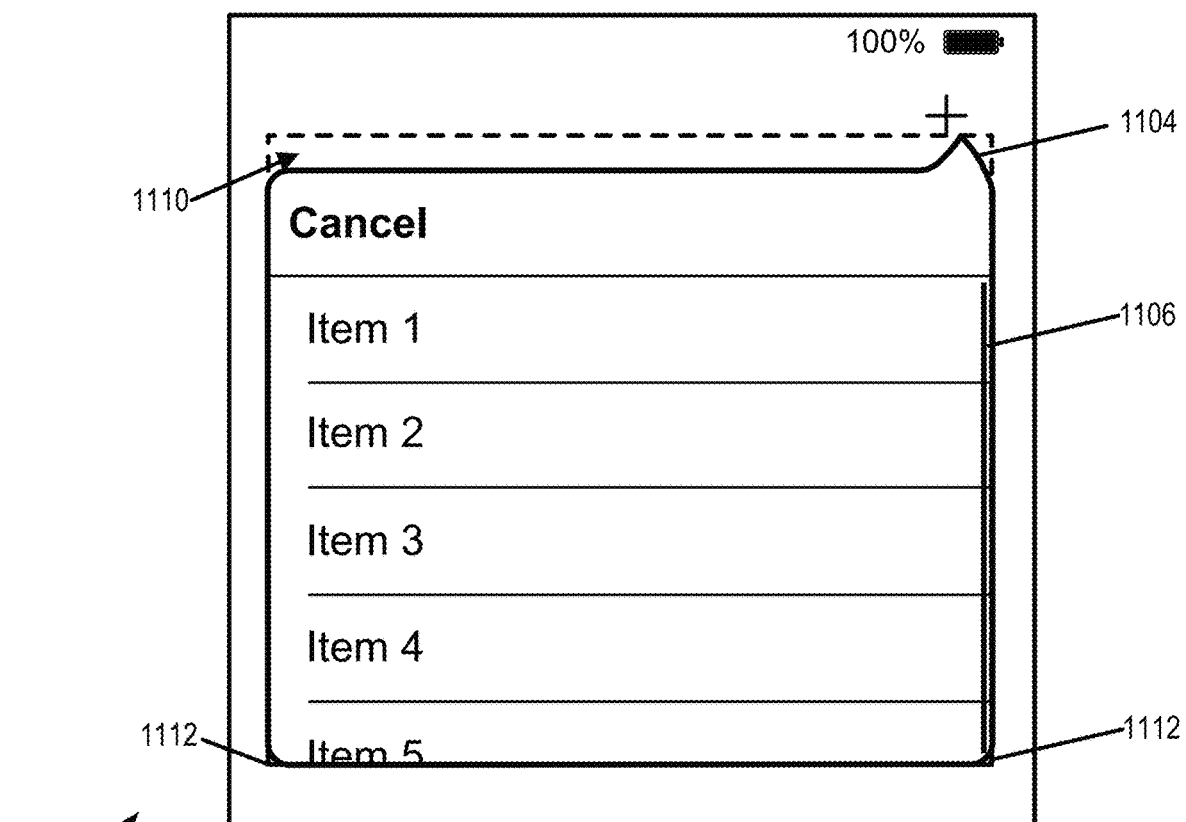
FIG. 11B illustrates an exemplary popover window employing bounding path techniques.

FIG. 11B illustrates depiction of popover windows using bounding path techniques. Using bounding path techniques, an expanded bounding area 1110 can now include the corner notch 1104. The expanded bounding area 1110 can be included within the bounding path such that the scroll indicator 1106 can reach into the corner. Without implementation of bounding path techniques, the scroll indicator extends too far and is clipped by the corner, because it is not aware of the corner (no bounding path). If popovers used bounding path techniques, the scroll indicator would be able to stop short of the corner similar to how it does on the modern smartphones. The more significant use of bounding path for popover windows is for proper display of the corners 1112 which get cut off in other embodiments. The bounding path techniques allow for more accurate representation of the corners of the popover windows.

V. Memory Optimization

Encoding the entire display screen can increase processing and memory requirements for electronic devices. It is desirable to reduce the processing and memory requirements for encoding bitmaps of non-rectangular displays.

One technique for memory optimization is to limit bitmap data encoding to preselected regions of the display where content can possibly be limited by dividing the multimedia content into encoding regions and skip regions; do not encode data from skip region.

Figure 12:
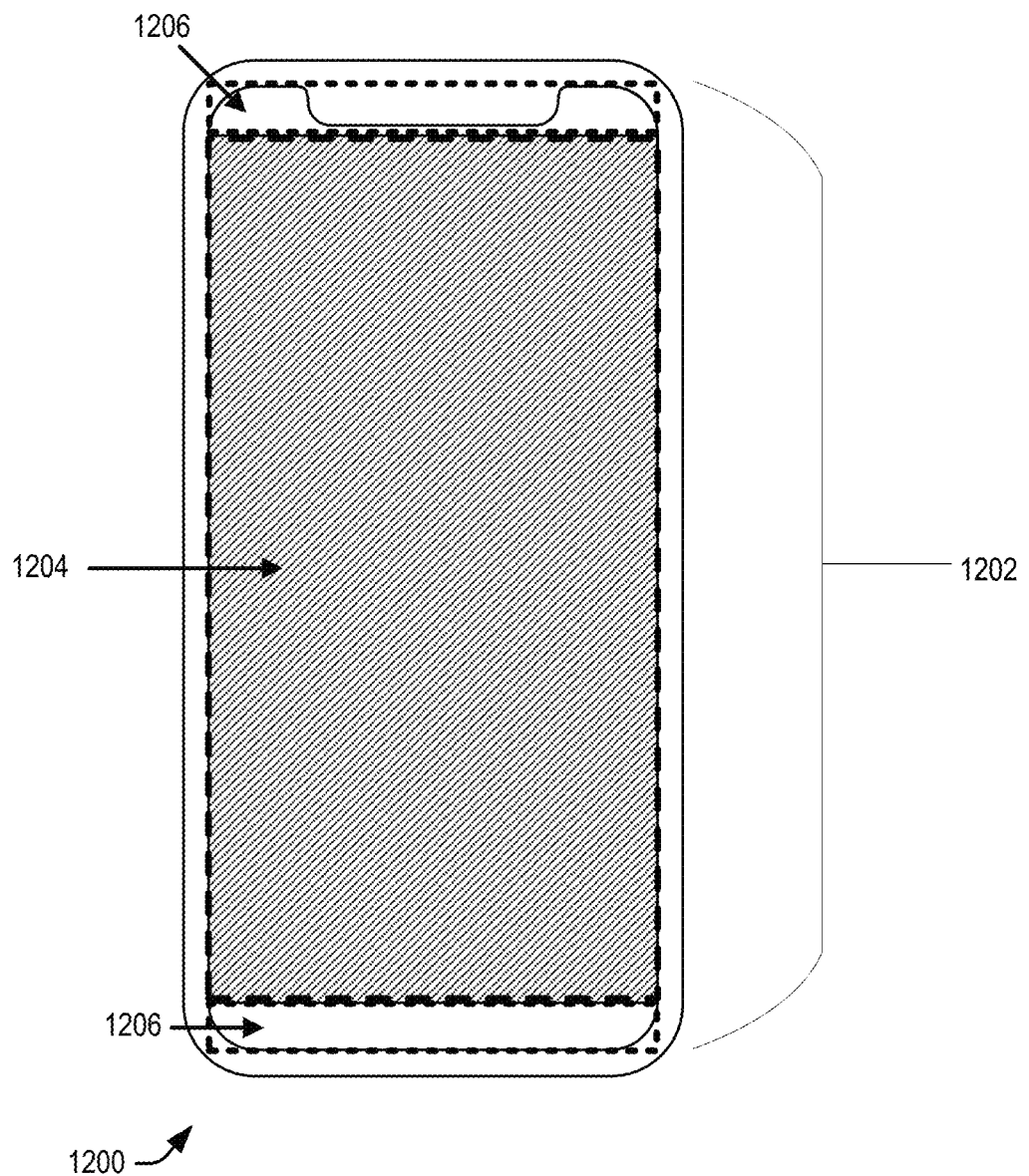
FIG. 12 illustrates an exemplary depiction of memory optimization according to some embodiments

FIG. 12 illustrates an exemplary depiction of memory optimization according to some embodiments. FIG. 12 depicts an electronic device 1200, in which the bounding path 1202 of the display is divided into multiple regions. The skip region 1204 is depicted as the rectangular region in the center of the display and can be defined as the largest rectangular region that fits completely within the non-rectangular display area. The skip region 1204 is completely within the viewable area of the display, therefore there is no need to encode this area. The encoding regions 1206 comprise the display areas outside the skip region. The encoding areas 1206 include both viewable and non-viewable areas. One method to optimize memory is to limit the encoding to the encoding areas 1206.

In some embodiments of the content shifting method, the bitmap and the bounding dimensions for the non-rectangular areas are limited to encoding areas of the non-rectangular display area that lie outside an area defined by a largest rectangular region that fits within the non-rectangular display area.

VI. Run-Length Encoding

The process for checking each position of a bitmap to ensure the content is viewable can be both time consuming and increases memory requirements and slows time for generating content on a non-rectangular display. One solution includes using a bitmap that was generated by run length encoding. The process of generating the bitmap by run length encoding can reduce the time and decrease the memory requirements for determining a location where the content can fit within a viewable area of the display.

Figure 13:
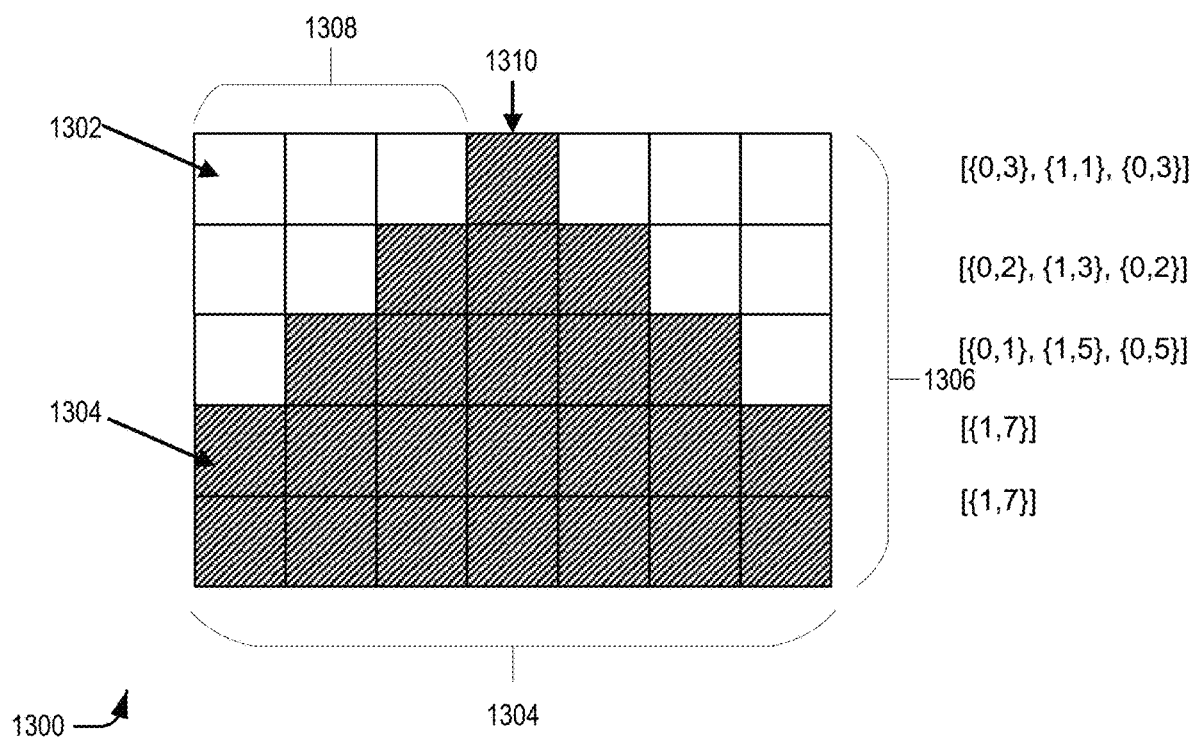
FIG. 13 illustrates an exemplary depiction of run length encoding according to some embodiments.

FIG. 13 illustrates a exemplary bitmap for describing the concept of run length encoding. Each bock on the exemplary bitmap 1300 represents a position on a display. The unshaded blocks, such as 1302, are non-viewable. The shaded blocks, such as 1304 are viewable. A line can be either an entire row 1304 or column 1306 of consecutive positions. A group 1308 of positions can be one or more positions, all of which are viewable or non-viewable.

The bitmap is created for a bounding box (bounds) around a non-rectangular area. The bounding box comprises a plurality of lines 1304, 1306, each of the lines comprising one or more groups 1308 of positions. The positions of the one or more groups 1308 can be either viewable or non-viewable. For example, the group 1308, are all non-viewable. Another group 1310, consists of only one position and it is viewable.

Next, a data structure is created using the bitmap. The bitmap is stored as an array that includes a plurality of nodes, each node including a first value indicating a number of positions within the group of positions, and a second value indicating whether the group of positions of the node are viewable or non-viewable. In one embodiment, each node represents a group of positions having the same value (0,1) that identifies whether the position is viewable or non-viewable. For example, the array [{0,3},{1,1},{0,3}] represents the first line of an exemplary bitmap shown in FIG. 13 having 7 positions. The first value of the node {0,3} indicates whether the node is viewable or non-viewable. In some embodiments, a zero indicates the node is non-viewable. In some embodiments, a value of one indicates that the node is viewable.

The first three positions of the first line of the bitmap of FIG. 13 are non-displayable, therefore the node a value of zero. The second value of the node indicates the number of positions of the group. The node {0,3} indicates the node is three positions in length. The fourth position is displayable, therefore the second node {1,1} has a value of one and is one position in length. The fifth, sixth, and seventh positions are non-displayable, therefore the third node {0,3} has a value of zero with a node length of three positions. The second line of the array shown in FIG. 13 can be encoded as ({0,2},{1,3},{0,2}. The third line of the array can be encoded as [{0,1},{1,5},{0,1}]. The fourth and fifth lines have identical encoding arrays of {1,7}. One skilled in the art can appreciate that this process can be expended for hundreds to thousands of positions per line and for hundreds to thousands of lines, resulting in more complex, larger arrays.

The resulting data structure can be stored in a memory. This process can be expanded for hundreds of positions and the use of a simple array allows for compression of the bitmap information to reduce the time required for hit testing to determine whether content will or will not need to be shifted to fit on a non-rectangular display. Once the data structure is stored, it may be used in determining a location for displaying content.

The operating system receives, from an application executing on the computer device, a request to display rectangular content in the non-rectangular area. The request can include dimensions of the rectangular content. Run length encoding can be used to determine if the rectangular content is viewable on in the non-rectangular area. The bitmap is used to quickly determine whether an initial location for the rectangular content is viewable by accessing the first node of the array. If the rectangular content is not viewable at the initial location, the nodes in the array can determine a new location where the content would be viewable.

Separate bitmap encodings can also be created for each axis (horizontal and vertical), which can be used together for maximum performance hit testing.

In a modified version of the run length encoding, instead of each node storing the count of the number of columns/rows that the value applies to, the node would store the absolute position (index) of the last column/row that the value applies to. This modification allows the array of nodes representing a particular row/column to be binary searched when looking for a specific x-y point to hit test, which is faster than the linear search that must be done with the current implementation, so it would be important when there are many nodes per row/column (which would happen with complex shapes).

A. Method for Run-Length Encoding

Figure 14:
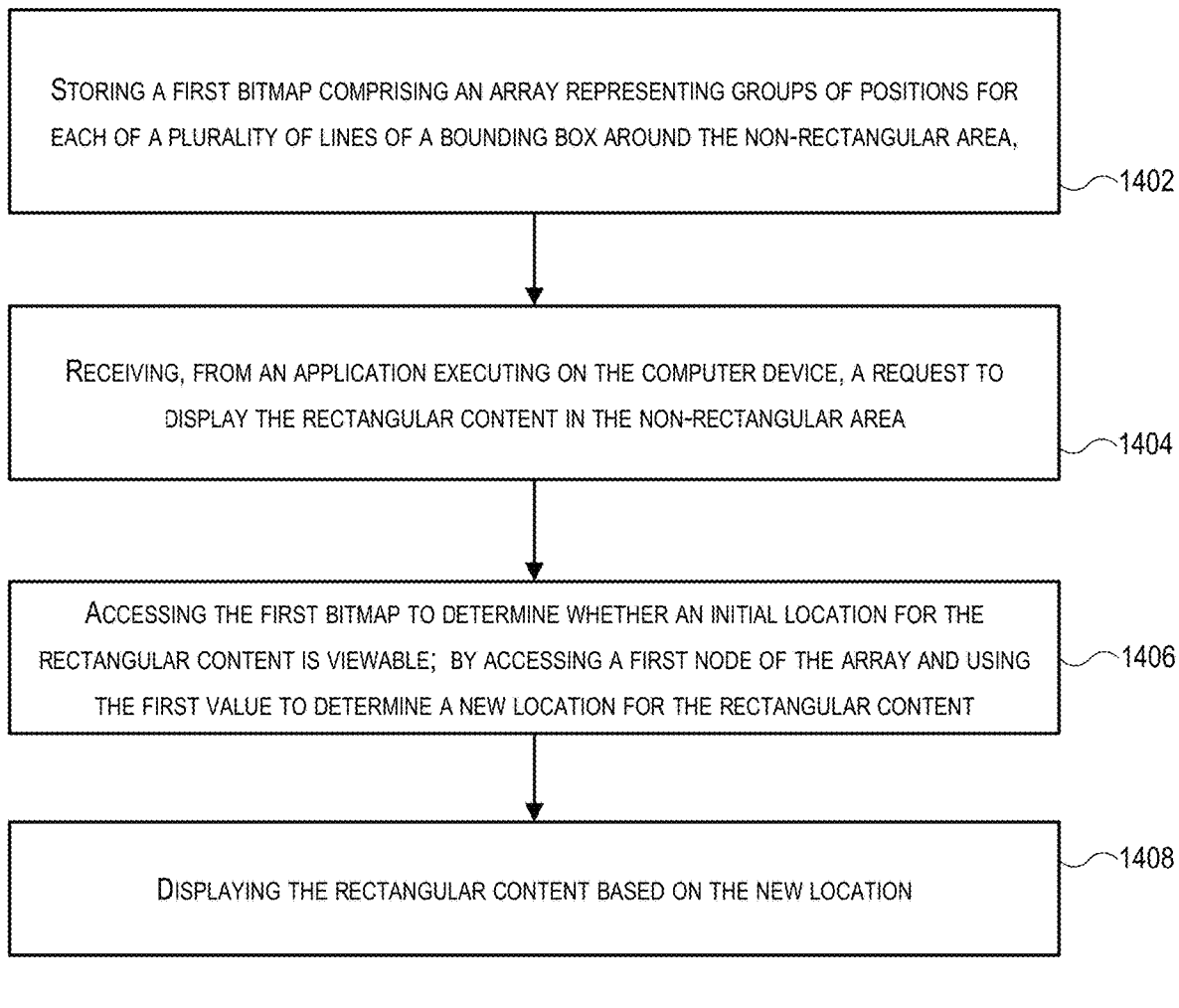
FIG. 14 illustrates an exemplary flow diagram of run length encoding according to some embodiments.

FIG. 14 illustrates an exemplary flow diagram of run length encoding 1400 according to some embodiments.

At 1402, a first bitmap comprising an array representing one or more groups of positions for each of a plurality of lines of a bounding box around the non-rectangular area is stored. The positions of the one or more groups can be all viewable or non-viewable. The array includes a plurality of nodes, each node including a first value indicating a number of positions within the group of positions. The node can include a second value indicating whether the group of positions of the node are viewable or non-viewable. The run length encoding technique includes storing a first bitmap comprising an array representing one or more groups of positions for each of a plurality of lines of a bounding box around the non-rectangular area, where the positions of the one or more groups are all viewable or non-viewable. The array includes a plurality of nodes, each node including a first value indicating a number of positions within the group of positions, and a second value indicating whether the group of positions of the node are viewable or non-viewable. The first bitmap can be stored in a memory of a computing device.

At 1404, an application executing on the computer device can request to display the rectangular content in the non-rectangular area. The rectangular content can comprise static or dynamic content. The non-rectangular area can comprise an area of a non-rectangular display with curved corners or an area within a window of a display with non-rectangular corners. The application can be a first party application, developed by the manufacturer of the computing device. The application can alternately be a third party application.

At 1406, the first bitmap can be accessed to determine whether an initial location for the rectangular content is viewable by accessing a first node of the array and using the first value to determine a new location for the rectangular content. The run length encoding technique optimizes the look-up time for displaying rectangular content because it can quickly ascertain adjustments required to properly fit the content on the display. For example, if an application desires to place content on the second line of the bitmap depicted in FIG. 13, the bitmap node {0,2} quickly informs the translation module that the content will need to be shifted to the right two positions because the first two positions of the line are un-viewable. This technique can be quickly applied for multiple lines to determine a position to display the rectangular content.

At 1408, the rectangular content can be displayed based on the new location. In some embodiments of the run length encoding technique, the translation module can send the display module instructions translate the rectangular content as required so it will be viewable on the display.

In some embodiments, the first bitmap can be a source bitmap. In this way the run length encoding technique can be employed to generate the source bitmap. The process of creating the source bitmap can include identifying the bounding box for the non-rectangular area of the computing device. a rectangular area encompassing the entire non-rectangular display area. The bounding box is a rectangular area encompassing the entire non-rectangular display area. The bounding box can have a plurality of positions, the positions can be located with a horizontal row and vertical column. Each of the positions within the bounding box may contain a pixel enabling the position to be viewable. Some of the positions may not contain a pixel (i.e., a position in a corner or in a sensor cutout region may not have a pixel) and therefore some positions would not be viewable.

In some embodiments, each position in the bounding box can be given a value indicating whether the position is viewable or not. In some embodiments, a value of one indicates that the position is not viewable. In some embodiments, a value of one indicates that position is viewable. The positions in the bounding box for a plurality of lines. In some embodiments, the lines can comprise a horizontal row of positions. In some embodiments, the lines can comprise a vertical column of positions. The positions in a line can be grouped such that all the positions in a group have the same value (viewable or non-viewable). At least one group for each line includes a plurality of positions. Each line has at least one group. In some embodiments, the group can be saved as a node having two values. The first value of the node can be the value (viewable or non-viewable) for the group. In some embodiments, the second value can be the number of positions in the group. In other embodiments, the second value can be the last column, for horizontal row lines, having the value for the group. In some embodiments, the second value can the last row, for vertical lines, having the value for the group. In some embodiments, each line of the bounding box can comprise of a plurality of nodes. The nodes can be saved as an array in a data structure in the memory of the device. The data structure can comprise an initial bitmap.

Memory for run length encoding can also be optimized in cases where the bitmap and the bounding box for the non-rectangular area are limited to encoding areas 1206, as shown in FIG. 12, of the non-rectangular display area that lie outside an area defined by a largest rectangular region 1204, as shown in FIG. 12, that fits within the non-rectangular display area 1202, as shown in FIG. 12.

In some embodiments, the request to display the rectangular content in the non-rectangular area includes dimensions of the rectangular content. The dimensions can be linear dimensions or a number of pixels. In some embodiments, the plurality of lines of the bounding box comprise vertical lines. In some embodiments, the second value of the node indicating a number of positions for a group comprises an index position representing a row number of a last row or a column number of a last column for which the first value applies.

In some embodiments, the non-rectangular area corresponds to a first window allocated within a second window or view on the display of the computing device. In other embodiments, the parent application generates the rectangular content for display in the first window and a child application is assigned the second window. In some embodiments, the parent application limits the data exchange from the child application to only include the size and the shape of the second window (view).

B. Fast Node Copy

A fast node copying (FNC) technique can use the run length encoding to select a particular portion of the bitmap needed when one application is allocated only part of a screen. Thus, fast node copying can propagate the non-rectangular display shape down the hierarchy to windows viewable within each application. The FNC technique receives an existing source bitmap (e.g., for entire non-rectangular screen) and a rectangular area allocated to the application. The rectangular area may lie wholly or partially inside the rectangular bounds of the existing bitmap. The FNC technique generates a new bitmap that represents a copy of the portion of the original bitmap that applies to just the rectangular area.

Figure 15:
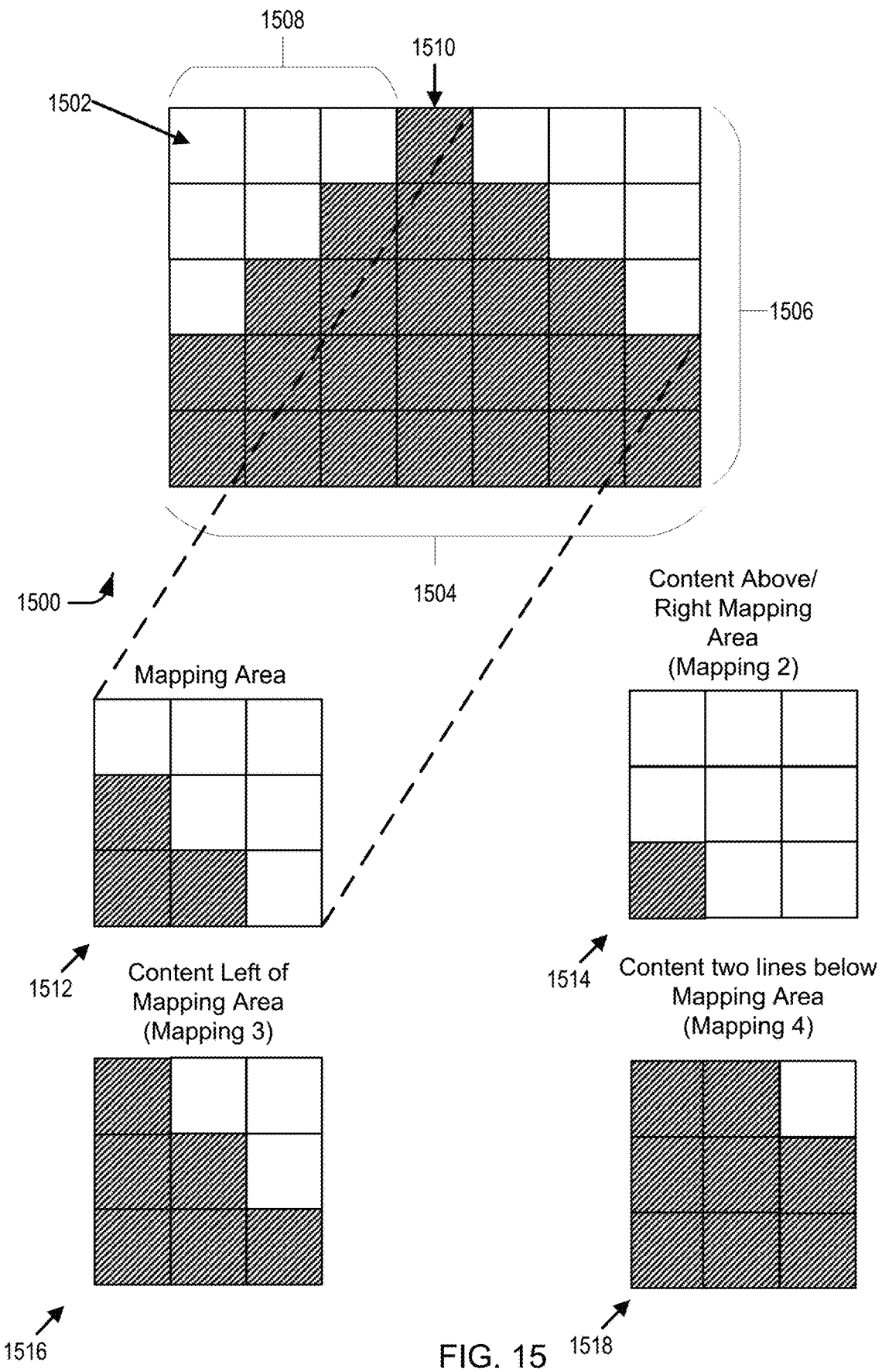
FIG. 15 illustrates an exemplary depiction of a bitmap for run length encoding.

FIG. 15 illustrates an exemplary depiction of the fast node copying technique. Each bock on the exemplary bitmap 1500 represents a position on a display. The unshaded blocks, such as 1502, are non-viewable. The shaded blocks, such as 1504 are viewable. A line can be either an entire row 1504 or entire column 1506 of consecutive positions. A group 1508 of positions can be one or more positions, all of which are viewable or non-viewable. The bitmap is created for a bounding box (bounds) around a non-rectangular area. The bounding box comprises a plurality of lines each of the lines comprising one or more groups 1508 of positions. The positions of the one or more groups 1508 can be either viewable or non-viewable. For example, the group 1508, are all non-viewable. Another group 1510, consists of only one position and it is viewable.

FIG. 15 also identifies a mapping area 1512 which can comprise a first bitmap. The mapping area 1512 depicted is the three by three grid from the exemplary bitmap. If an application seeks to display content outside the first bitmap by one line above, the resulting display will appear as mapping 2 or mapping area 1514. Similarly, if the application seeks to display content outside the bitmap, but one line to the right of the first bitmap, the resulting display will appear as in mapping 2. If an application seeks to display content outside the first bitmap by one line to the left of the first bitmap, the resulting display will appear as in mapping 3 or mapping area 1516. If an application seeks to display content outside the first bitmap by two lines below the first bitmap, the resulting display will appear as in mapping 4 or mapping area 1518.

In various embodiments, FNC technique can check whether the rectangular area lies outside the existing bitmap. Those regions outside the bounding path of the original bitmap can be stored with a value indicating the regions are non-viewable. Next, the FNC technique determines how much, if any, of the existing bitmap "skip region" can be used for the first bitmap. The skip region is the rectangular area inside the existing bitmap where the entire width is all "inside" the bounding path, stored with a value indicating the area is viewable. The skip region is encoded separately with a location and height, instead of needing one or more nodes for every row of positions (pixels) inside it.

Based on the rectangular areas inside and outside the existing, the size of the first bitmap, and the number of nodes stored in the existing bitmap, the FNC technique computes the number of nodes that can be required to store the data in the first bitmap. The FNC technique attempts to allocate space for as few nodes as possible to reduce memory overhead of each bitmap. The node count may be zero, if the entire bitmap is skip region (i.e., the bounding path is a simple rectangle with every pixel "inside"). In this case, the FNC technique is finished.

If the node count is non-zero, the FNC technique creates and/or copy nodes for the first bitmap. The FNC technique proceeds to iterate row-by-row of positions (pixels) in the rectangular area for the first bitmap; for each row of pixels. If the row lies inside the first bitmap's skip region, the FNC skips ahead and advances to the first row after the skip region. If the row corresponds to a source row that is outside the source bitmap (above or below it), the FNC inserts a single spacer node representing the entire row is outside, and then continue on to the next row. If multiple nodes are required for this row, the FNC can proceed to create or copy the nodes one by one.

In various embodiments, if the first bitmap extends to the left of the existing bitmap, the FNC inserts a node that represents the number of pixels to the left as the first node, and continue on to the next node. If the row in the first bitmap corresponds to a row inside the skip region of the source bitmap, the FNC technique creates a node in the first bitmap to represent those columns. Then, if the first bitmap extends to the right of the source bitmap, the FNC inserts an extra new node indicating this entire right-hand extended region is outside the existing bitmap. At this point, the FNC is finished with this row of nodes in the first bitmap.

In various embodiments, the FNC technique can find the node in the source bitmap that contains the current column for the first bitmap, if one exists. If no node can be found, if the first bitmap extends to the right of the source bitmap, the FNC inserts an extra new node indicating this entire right-hand extended region is outside. The FNC technique continues on to the next row. If a node was found, the FNC can create and store a new node for the first bitmap using the data from the source node. The FNC continues on to the next node if necessary.

In some embodiments, the run length encoding techniques can further include creating the first bitmap by copying a portion of the plurality of nodes of a source bitmap to the first bitmap. The first bitmap can be defined as a portion of the source bitmap corresponding to a non-rectangular display area for a view within a window. In such embodiments, the copied portion of nodes corresponds to an overlap of the bounding box for the first bitmap and a source bounding box of a non-rectangular display of the computing device. The first bitmap can be stored in the memory of a computing device.

In some embodiments, the run length encoding techniques can further include identifying a first line of the plurality of lines of the source bitmap. A line of the plurality of lines can be a horizontal row or a vertical column within the source bitmap. Each line can be comprised of a plurality of nodes. The next step can include copying a portion of the nodes in the first line and additional lines corresponding to an overlap between the source bitmap and the bounding box. One or more spacing nodes can be inserted into the first bitmap depending on whether the line extends outside a limit of the source bitmap.

In some embodiments, if the first bitmap extends outside a left side of the source bitmap, a first spacing node can be inserted prior to a first node for an overlap line. The first spacing node can represent the second value of the first node. The second value of the first node can indicate a number of positions the first bitmap extends outside a left side of the source bitmap. The length of the first spacing node can be equal to or greater than the second value of the first node. In this way, the content can be copied into a viewable area of the display.

In some embodiments, the run length encoding technique can include creating a center node in the first bitmap. The center node can represent a plurality of columns in the source bitmap if a select line of the plurality of lines in the first bitmap lies within a skip area of the source bitmap. The skip area comprises the rectangular area inside the source bitmap in which the select line is all inside a viewable area. The content in the center node can be copied without adding spacing nodes because it consists of content within a viewable area of the display.

In some embodiments, if the first bitmap extends outside a right side of the source bitmap a second spacing node can be inserted. The second spacing node representing a number of positions the first bitmap that extends outside a right side of the source bitmap. The purpose of the second spacing node to ensure content is copied within a viewable area of the display.

In some embodiments, if a select line of the plurality of lines of the first bitmap is above or below a bounds of the source bitmap a line node can be inserted. A line node is an empty spacing node that is used to move the content down if the first bitmap is above the bounds of the source bitmap and therefore not viewable. Alternatively, a line node can move the content up if the first bitmap is below the lower bounds of the source bitmap.

C. Corner Encoding

Corner encoding is another technique for representing the shapes of corners of a rectangle. For a number of reasons, rounded corners of rectangles that use non-circular arc/curve shapes for the corners comprise an important use case.

Figure 16:
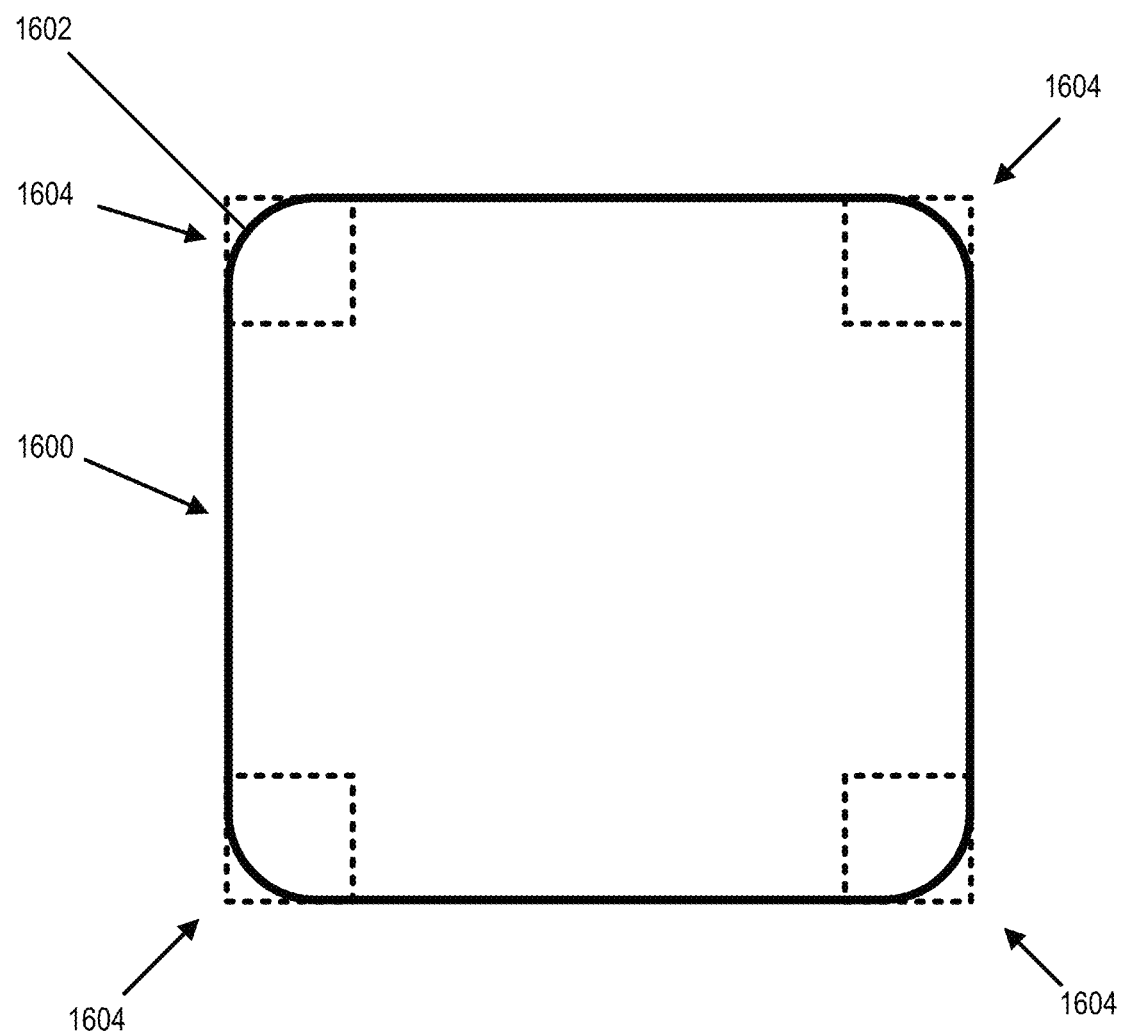
FIG. 16 illustrates an exemplary diagram of corner encoding according to some embodiments.

FIG. 16 represents an exemplary display 1600 for a wearable device with curved corners 1602. In some embodiments, the corner can be represented as a square 1604, where the corner can be separately encoded from the other area of the display. This representation can be a rectangle with corners. The rectangle can be a squared corner where the corners comprise a complex curve, as shown in FIG. 16.

Figure 17:
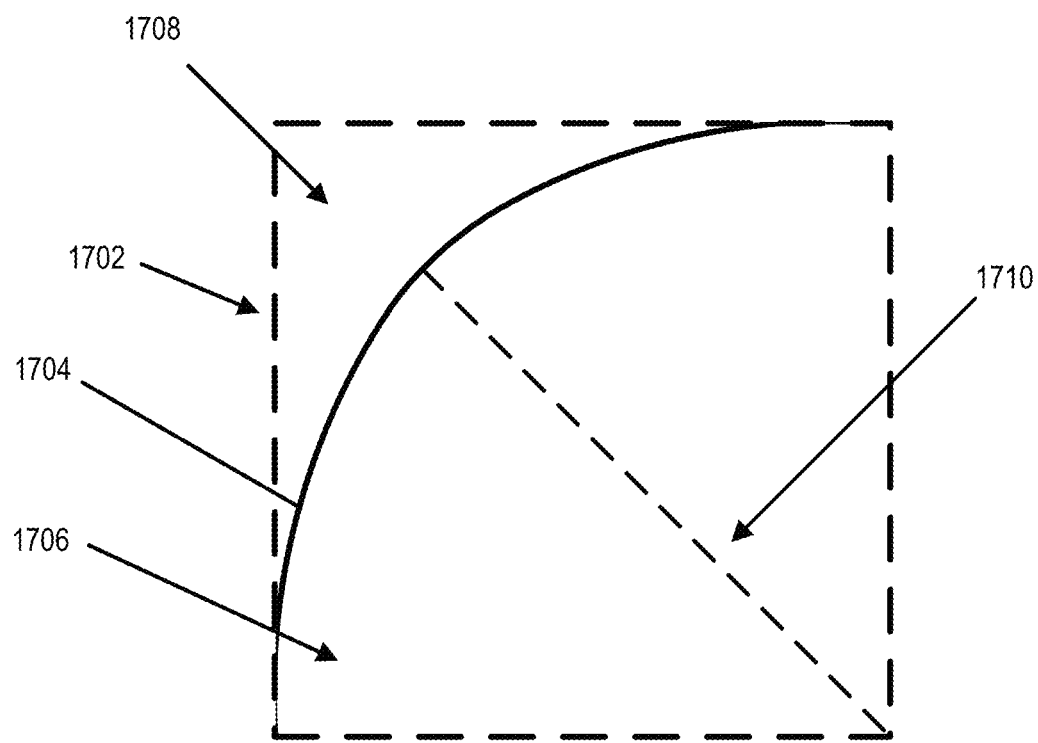
FIG. 17 illustrates an exemplary diagram of a reference corner for corner encoding according to some embodiments.

FIG. 17 is an illustration of a corner of the rectangle 1700 of a display. The curve 1704 depicted in FIG. 17 is a complex curve, not a simple arc, in which several equations can be used to represent different parts of the curve. It would be desirable to have a simple way to represent these arbitrary curves, such as curve 1704, making up the corner. In some embodiments, two corners of the display may have curves and the other two corners of the display have a sharp edges. In other embodiments, the radii for the corner curves may be different for some, or all of the corners. Each corner of the rectangle is a corner 1702. A corner 1702 is a square that comprises the edge of the rectangle. The squares are sized such that the square encompasses all non-straight (curved) part of the corner. As shown in FIG. 17, the viewable area 1706 of the corner can be inside of the curve 1704. The non-viewable area 1708 exists outside the curve 1704. The curve 1704 can be defined by one or more radii 1710. In some embodiments, each corner 1702 may have similar radii 1710. In other embodiments, the radii 1710 for each corner 1702 can be distinct. In accordance with the corner encoding techniques, a representation of the corner curve is stored.

Figure 18:
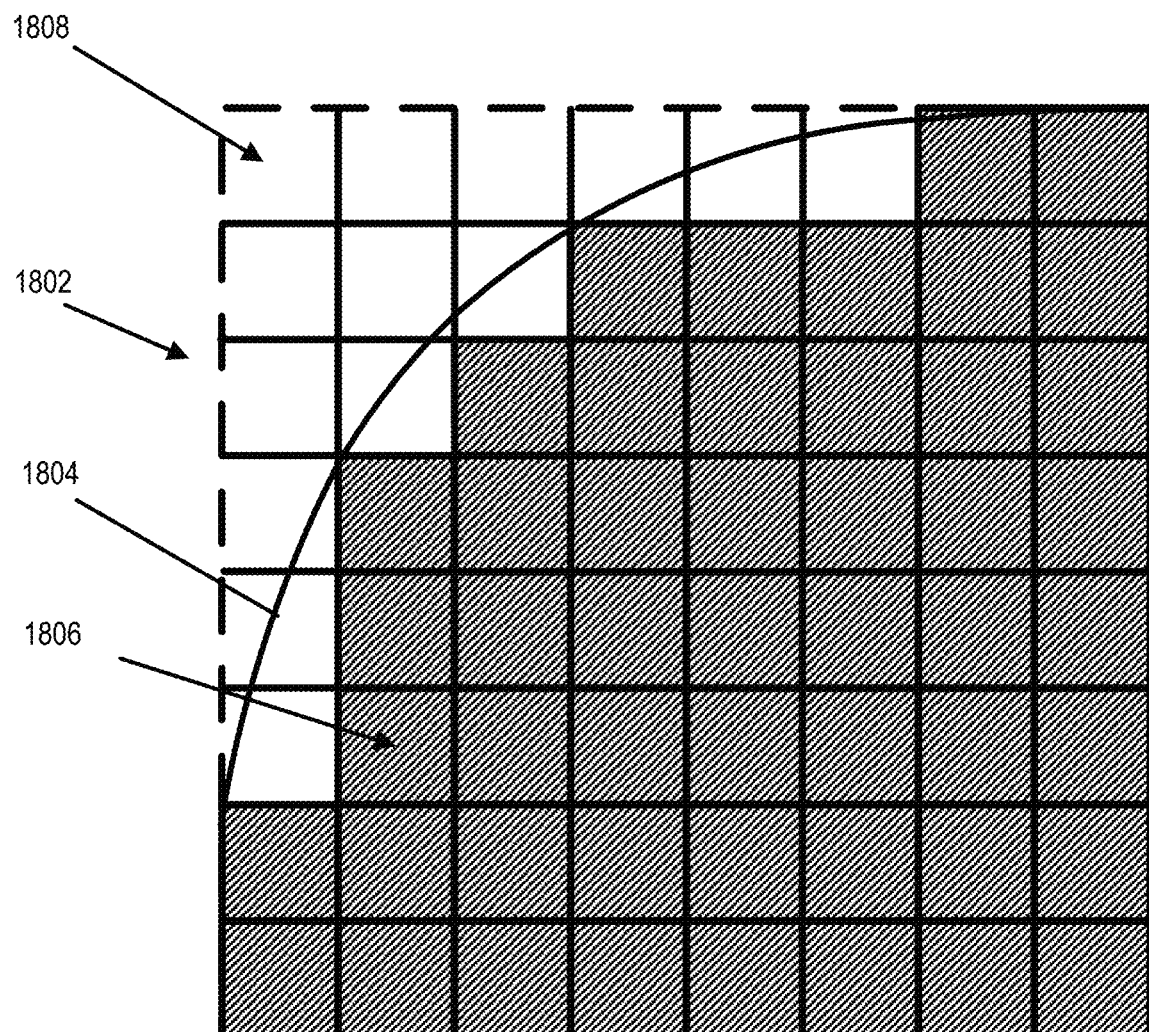
FIG. 18 illustrates an exemplary diagram of a reference corner bitmap for corner encoding according to some embodiments.

FIG. 18 depicts corner encoding technique 1800. The corner cell 1802 is divided into a series of positions that are either viewable or non-viewable. The curve 1804 is depicted. The cells with shading inside the curve 1804, as shown in FIG. 18, represent viewable cells 1806. The cells outside the curve without shading represent non-viewable cells 1808. This corner cell 1802 information is store different from the previously described run length encoding. The curve 1804 is increasing from the bottom left to the top right of the corner cell 1802. The curve 1804 is designed so it can never cross itself. Therefore, some shortcuts can be used in storing the data. For each row of positions (or pixels), the corner encoding technique 1800 stores the off-set from the edge of the corner cell 1802. The off-set is the number of positions that is outside the curve of the corner. For example, for the first line, 6 positions are outside of the curve 1804 and therefore the encoding can be saved with the value of 6. The corner encoding process 1800 is repeated for each row of the corner. For the second row of the corner cell 1802, there are 3 positions outside the corner cell. Therefore, the value for the second row is 3. The corner encoding for FIG. 18 can be represented by the array [6, 3, 2, 1, 1, 1, 0, 0]. This presents a small representation for the arbitrary shape of the curve.

The corner encoding technique can also employ a reference corner. If the curves for the corners have the same radii, the corner encoding technique would only need to be performed for the reference corner and the results could be translated for the other corners. Therefore, the corner bitmap would not need to be stored for each corner, which effectively is just a rotation of the bitmap for the reference corner. Using simple transformations, the corner bitmap information could be applied to one or more other corners. If all the corners do not have identical curves, the corner encoding technique can store one corner bitmap per unique curve shape. These unique corner bitmaps can be transformed for corners with identical shapes.

Figure 19A:
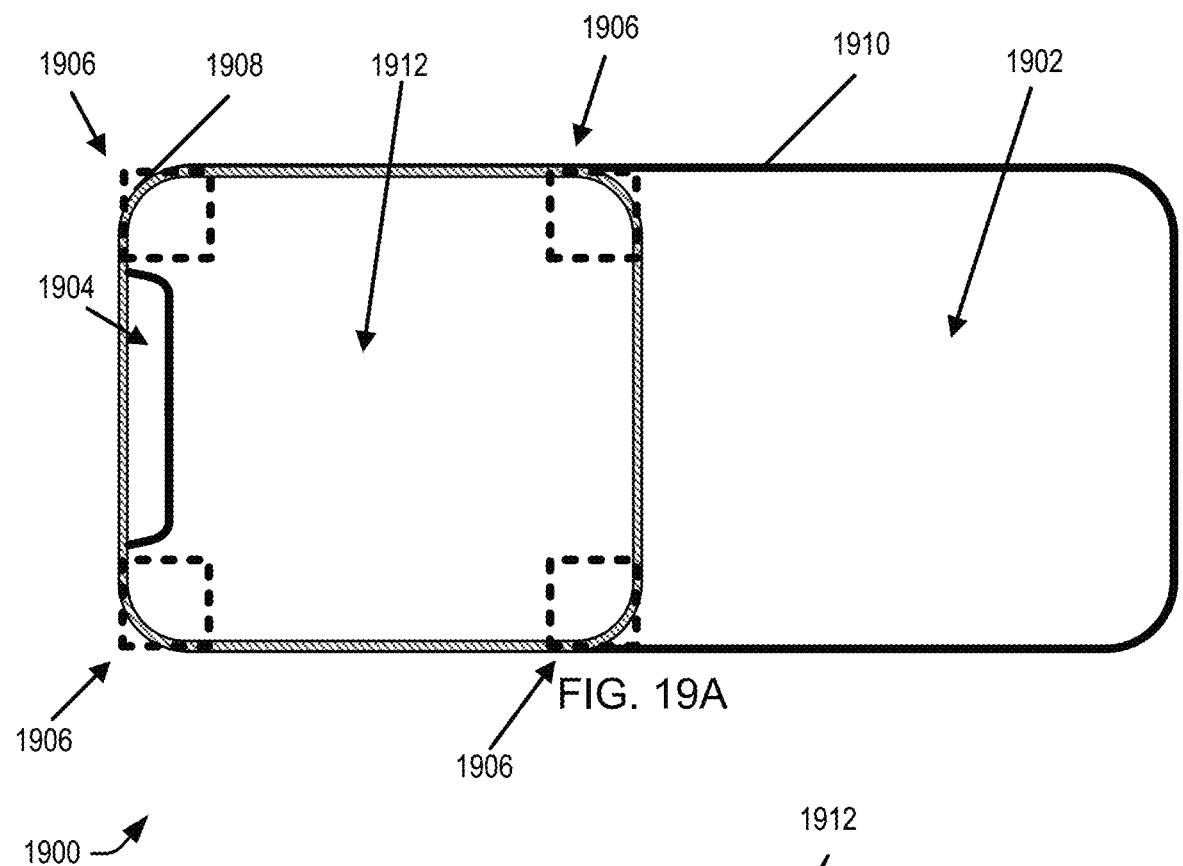
FIGS. 19A-19B illustrates an exemplary diagram of an electronic device employing corner encoding according to some embodiments.
Figure 19B:
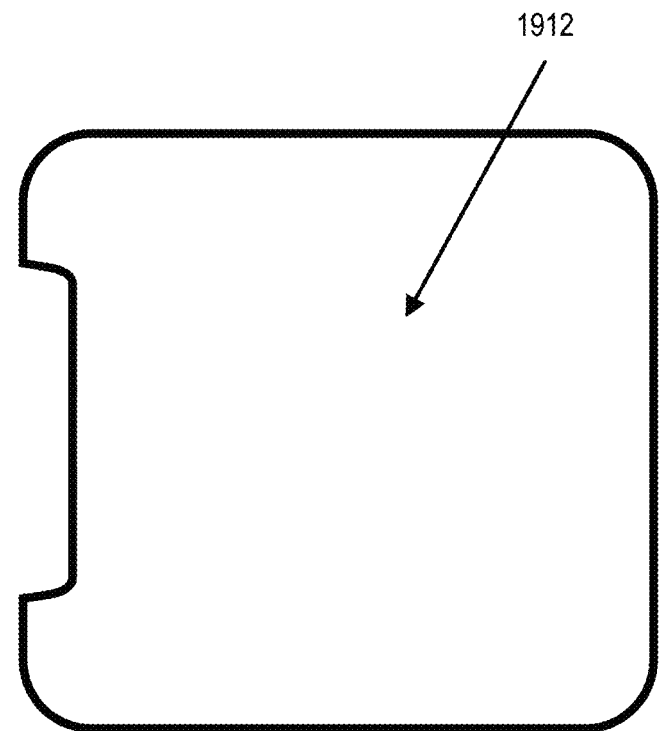

FIG. 19 illustrates the concept of intersecting shapes 1900. FIG. 19A depicts the computing device display 1902 with sensor cutout region 1904. The corner encoding technique allows for adding the corner bitmaps for each of the corner cells 1906 of the corner curves 1908. The node copying technique can check every time it is copying the nodes from the source bounding path 1910 if the node is within one of the corner cells 1906, it can not only consider the shape of the bounding path 1910 but the corner bitmap from the corner cells 1906. The resulting bitmap 1912 can be an intersection of a bitmap created from both run length encoding and from corner encoding. The corner encoding technique can be applied for both curved corners of displays or software defined corners (widows with curved corners). Therefore, the intersection of the run length encoding from the source bitmap and the corner bitmap. Corner encoding can be performed alone or in conjunction with run length encoding techniques. When copying nodes from the corner regions, the corner encoding technique can modify the values from the source bitmap to be the intersection.

The nodes can be stored in different groups. The bounding path techniques allow the user interface module to access the different groups to find the intersection or which ones are controlling. The bounding path techniques using run length encoding and corner encoding provide means to efficiently, in terms of both memory and overall performance, to render non-rectangular shapes.

In some embodiments, the corner encoding technique includes receiving, from an application executing on the computer device, a plurality of radii for each corner of the rectangular content. Next, the corner encoding technique can include creating a corner cell using the radii for each corner of the rectangular content. Next, the corner encoding technique can include encoding the corner cell to create a corner bitmap. Finally, the corner encoding technique can include storing a resultant bitmap to form an intersection between the first bitmap and the corner bitmap for each corner of the rectangular content.

VII. Example Device

Figure 20:
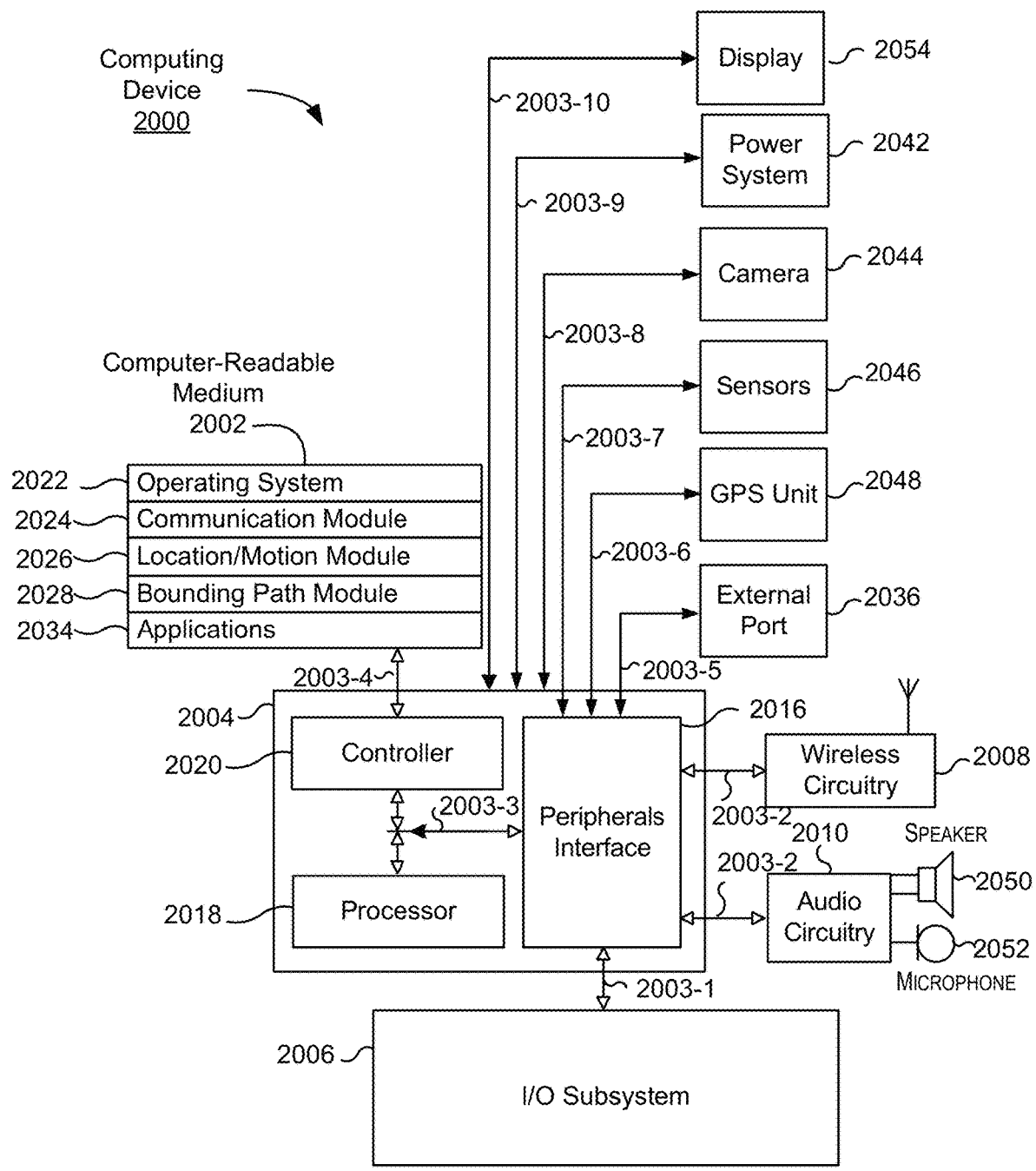
FIG. 20 illustrates an exemplary diagram of a computer device architecture.

FIG. 20 is a block diagram of an example device 2000, which may be a mobile device. Device 2000 generally includes computer-readable medium (memory) 2002, a processing system 2004, an Input/Output (I/O) subsystem 2006, wireless circuitry 2008, and audio circuitry 2010 including speaker 2050 and microphone 2052. These components may be coupled by one or more communication buses or signal lines 2003-1, 2003-2, 2003-3, 2003-4, 2003-5, 2003-6, 2003-7, 2003-8, 2003-9, 2003-10. Device 2000 can be any portable electronic device, including a handheld computer, a tablet computer, a mobile phone, laptop computer, tablet device, media player, a wearable device, personal digital assistant (PDA), a key fob, a car key, an access card, a multi-function device, a mobile phone, a portable gaming device, a car display unit, or the like, including a combination of two or more of these items.

The device 2000 can be a multifunction device having a touch screen in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 2000. In some implementations or circumstances, inadvertent contact with a graphic does not select the graphic. For example, a swipe gesture that sweeps over an application icon optionally does not select the corresponding application when the gesture corresponding to selection is a tap. Device 2000 can optionally also include one or more physical buttons, such as "home" or menu button. As menu button is, optionally, used to navigate to any application in a set of applications that are, optionally, executed on the device 2000. Alternatively, in some embodiments, the menu button is implemented as a soft key in a graphical user interface displayed on touch screen.

The device 2000 can incorporate a display 2054. The display 2054 can be a LCD, OLED, AMOLED, Super AMOLED, TFT, IPS, or TFT-LCD that typically can be found a computing device. The display 2054 may be a touch screen display of a computing device.

In one embodiment, device 2000 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2000 also accepts verbal input for activation or deactivation of some functions through microphone. Device 2000 also, optionally, includes one or more contact intensity sensors for detecting intensity of contacts on touch screen and/or one or more tactile output generators for generating tactile outputs for a user of device 2000.

In one illustrative configuration, device 2000 may include at least one computer-readable medium (memory) 2002 and one or more processing units (or processor(s)) 2018. Processor(s) 2018 may be implemented as appropriate in hardware, software, or combinations thereof. Computer-executable instruction or firmware implementations of processor(s) 2018 may include computer-executable instructions written in any suitable programming language to perform the various functions described.

Computer-readable medium (memory) 2002 may store program instructions that are loadable and executable on processor(s) 2018, as well as data generated during the execution of these programs. Depending on the configuration and type of device 2000, memory 2002 may be volatile (such as random access memory (RAM)) and/or non-volatile (such as read-only memory (ROM), flash memory, etc.). Device 2000 can have one or more memories. Device 2000 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 2002 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 2002 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 2002 and additional storage are both examples of non-transitory computer storage media. Additional types of computer storage media that may be present in device 2000 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 2000. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Device 2000 may also contain communications connection(s) 2008 that allow device 2000 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 2000 may also include I/O device(s) 2006, such as a touch input device, a keyboard, a mouse, a pen, a voice input device, a display, a speaker, a printer, etc.

It should be apparent that the architecture shown in FIG. 20 is only one example of an architecture for device 2000, and that device 2000 can have more or fewer components than shown, or a different configuration of components. The various components shown in FIG. 20 can be implemented in hardware, software, or a combination of both hardware and software, including one or more signal processing and/or application specific integrated circuits.

Wireless circuitry 2008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 2008 can use various protocols, e.g., as described herein. For example, wireless circuitry 2008 can have one component for one wireless protocol (e.g., Bluetooth®) and a separate component for another wireless protocol (e.g., UWB). Different antennas can be used for the different protocols.

Wireless circuitry 2008 is coupled to processing system 2004 via peripherals interface 2016. Interface 2016 can include conventional components for establishing and maintaining communication between peripherals and processing system 2004. Voice and data information received by wireless circuitry 2008 (e.g., in speech recognition or voice command applications) is sent to one or more processors 2018 via peripherals interface 2016. One or more processors 2018 are configurable to process various data formats for one or more application programs 2034 stored on computer-readable medium (memory) 2002.

Peripherals interface 2016 couple the input and output peripherals of the device to processor(s) 2018 and computer-readable medium 2002. One or more processors 2018 communicate with computer-readable medium 2002 via a controller 2020. Computer-readable medium 2002 can be any device or medium that can store code and/or data for use by one or more processors 2018. Medium 2002 can include a memory hierarchy, including cache, main memory and secondary memory.

Device 2000 also includes a power system 2042 for powering the various hardware components. Power system 2042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 2000 includes a camera 2044. In some embodiments, device 2000 includes sensors 2046. Sensors 2046 can include accelerometers, compasses, gyrometers, pressure sensors, audio sensors, light sensors, barometers, and the like. Sensors 2046 can be used to sense location aspects, such as auditory or light signatures of a location.

In some embodiments, device 2000 can include a GPS receiver, sometimes referred to as a GPS unit 2048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 2018 run various software components stored in medium 2002 to perform various functions for device 2000. In some embodiments, the software components include an operating system 2022, a communication module (or set of instructions) 2024, a location module (or set of instructions) 2026, a bounding path 2028 that is used as part of ranging operation described herein, and other applications (or set of instructions) 2034.

Operating system 2022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 2022 is system software that manages computer hardware and software resources and provides common services for computer programs. For example, the operating system 2022 can manage the interaction between the user interface module and one or more user application (s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 2024 facilitates communication with other devices over one or more external ports 2036 or via wireless circuitry 2008 and includes various software components for handling data received from wireless circuitry 2008 and/or external port 2036. External port 2036 (e.g., USB, FireWire, Lightning connector, 60-pin connector, etc.) is adapted for coupling directly to other devices or indirectly over a network (e.g., the Internet, wireless LAN, etc.).

Location/motion module 2026 can assist in determining the current position (e.g., coordinates or other geographic location identifiers) and motion of device 2000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 2026 receives data from GPS unit 2048 and analyzes the signals to determine the current position of the mobile device. In some embodiments, location/motion module 2026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 2008 and is passed to location/motion module 2026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 2000 based on the position coordinates of the corresponding transmitters. Regardless of the specific location technology used, location/motion module 2026 receives information from which a location fix can be derived, interprets that information, and returns location information, such as geographic coordinates, latitude/longitude, or other location fix data.

The bounding path module 2028 can receive requests from applications 2034 to display rectangular content in a non-rectangular display area of the display 2054. The bounding path module 2028 can adjust the digital content as necessary to avoid cutting off (clipping) or the digital content, as described herein.

The one or more applications programs 2034 on the mobile device can include any applications installed on the device 2000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 2006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 2006 can include a display and user input devices such as a keyboard, mouse, and/or track pad. In some embodiments, I/O subsystem 2006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 2002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 2000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used display information in a non-rectangular display area. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of bounding path techniques, the present technology can be configured to allow users to select to "opt in" or "opt out" of participation in the collection of personal information data during registration for services or anytime thereafter. In another example, users can select not to provide personal information to be displayed in non-rectangular areas. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the bounding path techniques, or publicly available information.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for displaying content in a non-rectangular area of a display of a computing device, the method comprising performing by one or more processors of the computing device:
   receiving, from an application executing on the computing device, a request to display the content in a rectangular region, wherein the computing device has a non-rectangular display, and wherein the request includes an aspect ratio of the rectangular region;
   identifying a long dimension of the rectangular region based on the aspect ratio, the long dimension being longer than a short dimension of the rectangular region;
   identifying a point in the non-rectangular area of the display;
   selecting an initial value for a selected dimension;
   retrieving a bitmap corresponding to a bounding box of an entire non-rectangular area of the display including a sensor cutout region of the display, the bitmap identifying coordinates in the bounding box that are viewable in the non-rectangular area and coordinates in the bounding box that are not viewable in the non-rectangular area of the display;
   using the bitmap to determine whether the initial value for the selected dimension extends into a non-viewable area of the display;
   when the selected dimension extends into the non-viewable area of the display, adjusting the selected dimension so that the selected dimension fits within the non-rectangular area of the display, thereby obtaining an adjusted rectangular region having the aspect ratio included in the request; and
   displaying the content in the adjusted rectangular region on the display using an adjusted value for the selected dimension.

2. The method of claim 1, further comprising:
   storing a secondary bitmap corresponding to bounding dimensions for a secondary non-rectangular display area of the computing device, the secondary bitmap identifying coordinates in a secondary bounding box that are viewable in the secondary non-rectangular display area;
   receiving, from a parent application executing on the computer device, a secondary rectangular region to be displayed;
   determining one or more initial locations on the secondary rectangular region in a coordinate space of the secondary bounding box;
   determining whether the one or more initial locations in the secondary bitmap are displayable within the secondary non-rectangular display area;
   performing one or more shifts to the one or more initial locations of the rectangular region on the secondary rectangular region to obtain one or more shifted locations until the one or more shifted locations are displayable in the secondary non-rectangular display area, thereby obtaining a secondary shifted rectangular region; and
   displaying the content in the secondary shifted rectangular region.

3. The method of claim 1, wherein the point comprises a global center point.

4. The method of claim 1, wherein the selected dimension is the long dimension and a non-selected dimension is the short dimension.

5. The method of claim 4 further comprising adjusting the non-selected dimension to preserve the aspect ratio.

6. The method of claim 1, wherein the selected dimension is the short dimension and a non-selected dimension is the long dimension.

7. The method of claim 6, wherein the adjusting the selected dimension is performed incrementally.

8. The method of claim 1, further comprising translating the adjusted rectangular region from local coordinates for the application to global coordinates for the non-rectangular area of the display.

9. A computer readable medium storing a plurality of instructions that, when executed by one or more processors of a computer device, cause the one or more processors to perform operations to display content on a non-rectangular area of a display of a computer device the operations comprising:
   receiving, from an application executing on the computer device, a request to display the content in a rectangular region, wherein the computer device has a non-rectangular display, and wherein the request includes an aspect ratio of the rectangular region;
   identifying a long dimension of the rectangular region based on the aspect ratio, the long dimension being longer than a short dimension of the rectangular region;
   identifying a point in the non-rectangular area of the display;
   selecting an initial value for a selected dimension;

retrieving a bitmap corresponding to a bounding box of an entire non-rectangular area of the display including a sensor cutout region of the display, the bitmap identifying coordinates in the bounding box that are viewable in the non-rectangular area and coordinates in the bounding box that are not viewable in the non-rectangular area of the display;

using the bitmap to determine whether the initial value for the selected dimension extends into a non-viewable area of the display;

when the selected dimension extends into the non-viewable area of the display, adjusting the selected dimension so that the selected dimension fits within the non-rectangular area of the display, thereby obtaining an adjusted rectangular region having the aspect ratio included in the request; and displaying the content in the adjusted rectangular region on the display using an adjusted value for the selected dimension.

10. The computer readable medium of claim 9, further comprising:

storing a secondary bitmap corresponding to bounding dimensions for a secondary non-rectangular display area of the computing device, the secondary bitmap identifying coordinates in a secondary bounding box that are viewable in the secondary non-rectangular display area;

receiving, from a parent application executing on the computer device, a secondary rectangular region to be displayed;

determining one or more initial locations on the secondary rectangular region in a coordinate space of the secondary bounding box;

determining whether the one or more initial locations in the secondary bitmap are displayable within the secondary non-rectangular display area;

performing one or more shifts to the one or more initial locations of the rectangular region on the secondary rectangular region to obtain one or more shifted locations until the one or more shifted locations are displayable in the secondary non-rectangular display area, thereby obtaining a secondary shifted rectangular region; and displaying the content in the secondary shifted rectangular region.

11. The computer readable medium of claim 9, wherein the point comprises a global center point.

12. The computer readable medium of claim 9, wherein the selected dimension is the long dimension and a non-selected dimension is the short dimension.

13. The computer readable medium of claim 12, further comprising adjusting the non-selected dimension to preserve the aspect ratio.

14. The computer readable medium of claim 9, wherein the selected dimension is the short dimension and a non-selected dimension is the long dimension.

15. The computer readable medium of claim 14, wherein the adjusting the selected dimension is performed incrementally.

16. A computer device for a network, comprising:
one or more memories; and
one or more processors in communication with the one or more memories and configured to execute instructions stored in the one or more memories to perform operations to display content on a non-rectangular area of a display the operations comprising:

receive, from an application executing on the computer device, a request to display the content in a rectangular region, wherein the computing device has a non-rectangular display, and wherein the request includes an aspect ratio of the rectangular region;

identify a long dimension of the rectangular region based on the aspect ratio, the long dimension being longer than a short dimension of the rectangular region;

identify a point in the non-rectangular area of the display;

select an initial value for a selected dimension;

retrieve a bitmap corresponding to a bounding box of an entire non-rectangular area of the display including a sensor cutout region of the display, the bitmap identifying coordinates in the bounding box that are viewable in the non-rectangular area and coordinates in the bounding box that are not viewable in the non-rectangular area of the display;

use the bitmap to determine whether the initial value for the selected dimension extends into a non-viewable area of the display;

when the selected dimension extends into the non-viewable area of the display, adjusting the selected dimension so that the selected dimension fits within the non-rectangular area of the display, thereby obtaining an adjusted rectangular region having the aspect ratio included in the request; and display the content in the adjusted rectangular region on the display using an adjusted value for the selected dimension.

17. The computer device of claim 16, wherein the one or more processors are further configured to execute the instructions to:

store a secondary bitmap corresponding to bounding dimensions for a secondary non-rectangular display area of the computing device, the secondary bitmap identifying coordinates in a secondary bounding box that are viewable in the secondary non-rectangular display area;

receive, from a parent application executing on the computer device, a secondary rectangular region to be displayed;

determine one or more initial locations on the secondary rectangular region in a coordinate space of the secondary bounding box;

determine whether the one or more initial locations in the secondary bitmap are displayable within the secondary non-rectangular display area;

perform one or more shifts to the one or more initial locations of the rectangular region on the secondary rectangular region to obtain one or more shifted locations until the one or more shifted locations are displayable in the secondary non-rectangular display area, thereby obtaining a secondary shifted rectangular region; and display the content in the secondary shifted rectangular region.

18. The computer device of claim 16, wherein the selected dimension is the long dimension and a non-selected dimension is the short dimension.

19. The computer device of claim 18, further comprising adjusting the non-selected dimension to preserve the aspect ratio.

20. The computer device of claim 16, wherein the selected dimension is the short dimension and a non-selected dimension is the long dimension.

* * * * *